(12) United States Patent
Liao et al.

(10) Patent No.: US 11,196,328 B2
(45) Date of Patent: Dec. 7, 2021

(54) KINETIC ENERGY GENERATING DEVICE

(71) Applicant: Shuhui Liao, Shenzhen (CN)

(72) Inventors: Shuhui Liao, Shenzhen (CN); Yuanfang Liu, Shenzhen (CN); Wanghong Liao, Shenzhen (CN)

(73) Assignee: ShenZhen EBELONG Technology Co., Ltd., Guangdong (CN)

( * ) Notice: Subject to any disclaimer, the term of this patent is extended or adjusted under 35 U.S.C. 154(b) by 613 days.

(21) Appl. No.: 16/074,425

(22) PCT Filed: Apr. 5, 2016

(86) PCT No.: PCT/CN2016/078438
§ 371 (c)(1),
(2) Date: Jul. 31, 2018

(87) PCT Pub. No.: WO2017/133073
PCT Pub. Date: Aug. 10, 2017

(65) Prior Publication Data
US 2019/0229601 A1      Jul. 25, 2019

(30) Foreign Application Priority Data

Feb. 4, 2016   (CN) .......................... 201610079022.0
Apr. 5, 2016   (WO) ................ PCT/CN2016/078438

(51) Int. Cl.
*H02K 35/02*   (2006.01)
*H02K 35/04*   (2006.01)
(Continued)

(52) U.S. Cl.
CPC .............. *H02K 35/02* (2013.01); *H02K 5/04* (2013.01); *H02K 7/003* (2013.01); *H02K 35/04* (2013.01)

(58) Field of Classification Search
CPC ........ H02K 33/00; H02K 33/02; H02K 33/10; H02K 33/16; H02K 35/00; H02K 35/02;
(Continued)

(56) References Cited

U.S. PATENT DOCUMENTS 3,563,245 A * 2/1971 McLean ................. H02K 35/06
607/35
2013/0285480 A1 * 10/2013 Ruff ....................... H02K 99/10
310/12.12

FOREIGN PATENT DOCUMENTS

CN            102938606 A   *   2/2013

OTHER PUBLICATIONS

Xu (CN 102938606 A) English Translation (Year: 2013).*

* cited by examiner

*Primary Examiner* — Tulsidas C Patel
*Assistant Examiner* — Robert E Mates
(74) *Attorney, Agent, or Firm* — Raymond Y. Chan; David and Raymond Patent Firm

(57) ABSTRACT

A high power kinetic energy generating device comprises: a magnetic group, a magnetically permeable cavity body, and a coil. The magnetic group comprises an upper magnetically permeable member, a lower magnetically permeable member, and a permanent magnet member. A magnetic gap is defined between the upper magnetically permeable member and the lower magnetically permeable member. The magnetically permeable cavity body and the magnetic group form a magnetically permeable cavity. The magnetically permeable cavity body further comprises a middle column arranged in the magnetically permeable cavity. The coil is also arranged in the magnetically permeable cavity, and surrounds the middle column. The middle column extends into the magnetic gap. The magnetic group is displaced relatively to the middle column, so that the middle column
(Continued)

moves into contact the upper magnetically permeable member and the lower magnetically permeable member alternately, which changes the direction of magnetic induction lines passing through the coil and therefore generates an induced current.

5 Claims, 22 Drawing Sheets

(51) Int. Cl.
*H02K 5/04* (2006.01)
*H02K 7/00* (2006.01)

(58) Field of Classification Search
CPC .......... H02K 5/04; H02K 35/04; H02K 7/003; H02K 7/1853; H02K 7/06; H02K 33/04; H02K 33/06; H02K 33/08
USPC .......................................................... 310/36
See application file for complete search history.

A-A

B-B

KINETIC ENERGY GENERATING DEVICE

CROSS REFERENCE OF RELATED APPLICATION

This is a U.S. National Stage under 35 U.S.C. 371 of the International Application Number PCT/CN2016/078438, filed Apr. 5, 2016, which claims priority under 35 U.S.C. 119(a-d) to Chinese application number 2016100790220, filed Feb. 4, 2016. The afore-mentioned patent applications are hereby incorporated by reference in their entireties.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an energy generating device, and more particularly to an energy generating device converting kinetic energy into electric power.

Description of Related Arts

To generate electric power by manual action or external widget force for small low-power consumption electronic products has been an ideal solution for the series of problems of battery power supply, such as short life, repeating costs, unreliability, non-environmental friendly, and etc. As the environmental pollution has gone worse and worse, it becomes especially critical to reduce the generation of industrial refuses nowadays. Common mechanical kinetic electric power devices are bulky, noisy, and relatively inefficient in generating electricity. Although small low-power consumption electronic products do not require much on the power supply device, conventional small kinetic power generating devices still cannot supply power efficiently.

SUMMARY OF THE PRESENT INVENTION

An object of the present invention is to provide a high power kinetic energy generating device, which is able to convert kinetic energy into electric power.

Another object of the present invention is to provide a high power kinetic energy generating device, which utilizes a magnetically permeable cavity structure and has the induction coil arranged on the middle column located in the magnetically permeable cavity, wherein the magnetic group is allowed to move up and down on a side of the magnetically permeable cavity, such that the entire coil can be completely covered by the magnetic induction lines and, therefore magnetic leakage can be reduced, which allows the coil to gain an enhanced change of magnetic flux from the movement of the magnetic group, so as to generate high powered induced current in the coil.

Another object of the present invention is to provide a high power kinetic energy generating device, which performs more efficiently in generating electricity.

Another object of the present invention is to provide a high power kinetic energy generating device, which has a magnetically permeable cavity body to reduce magnetic leakage.

Another object of the present invention is to provide a high power kinetic energy generating device, which has smaller size than regular conventional kinetic electricity generation device of the same power, provides high power electricity, and performs significantly better electromagnetic transduction, such that it has greatly enhanced industrial usability and much wider application.

Another object of the present invention is to provide a high power kinetic energy generating device, which, according to an embodiment, utilizes top down covering magnetically permeable material to wrap and cover the electricity generation components, so as to achieve the maximum utilization of the magnetic energy in the minimal size.

In order to achieve the above and other objects, the present invention provides a high power kinetic energy generating device, which comprises:

at least a magnetic group, comprising at least an upper magnetically permeable member, at least a lower magnetically permeable member, at least a permanent magnet member arranged between the upper magnetically permeable member and the lower magnetically permeable member, and at least a magnetic gap defined between the upper magnetically permeable member and the lower magnetically permeable member;

at least a magnetically permeable cavity body, wherein the magnetically permeable cavity body and the magnetic group form at least a magnetically permeable cavity, wherein the magnetically permeable cavity body comprises at least a middle column arranged in the magnetically permeable cavity; and at least a coil arranged in the magnetically permeable cavity and circling around the middle column, wherein the middle column is extended into the magnetic gap, wherein the magnetic group is displaced relatively to the middle column, so that the middle column moves into contact the upper magnetically permeable member and the lower magnetically permeable member alternately, which changes the direction of magnetic induction lines passing through the coil and therefore generates an induced current.

According to an embodiment, the magnetically permeable cavity body further comprises at least a magnetically permeable shell, wherein the middle column is assembled with or integrally formed with the magnetically permeable shell, wherein the magnetically permeable shell has at least an opening on at least one side thereof to be a magnetic group seal, wherein the rest sides of the magnetically permeable shell are shielded by magnetically permeable material.

According to an embodiment, the magnetically permeable cavity body is formed by two segments coupling with each other, so as to form the magnetically permeable cavity with the assembling of the two segments and the magnetic group.

According to an embodiment, the magnetically permeable cavity body further comprises at least an upper half cavity body shell and at least a lower half cavity body shell, wherein the middle column is assembled and comprises at least an upper middle column portion extended from the upper half cavity body shell and at least a lower middle column portion extended from the lower half cavity body shell.

According to an embodiment, the upper half cavity body shell comprises at least an upper shell body and three upper wings extended therefrom, wherein as the upper middle column portion is extended to the upper wings and opposite to the upper shell body, gaps are left between two sides of the upper middle column portion and the two upper wings, wherein the lower half cavity body shell comprises at least a lower shell body and three lower wings extended therefrom, wherein as the lower middle column portion is extended to the lower wings and opposite to the lower shell body, gaps are left between two sides of the lower middle column portion and the two lower wings.

According to an embodiment, the magnetically permeable cavity comprises at least an upper magnetically permeable cavity formed by the upper wings, the upper shell body, and the upper middle column portion and at least a lower magnetically permeable cavity formed by the lower wings, the lower shell body, and the lower middle column portion, wherein the upper magnetically permeable cavity and the lower magnetically permeable cavity form the magnetically permeable cavity.

According to an embodiment, the magnetically permeable cavity body further comprises at least an upper shell, wherein an end of the upper shell extends outward to form at least an upper rim, wherein another end of the upper shell extends outward and downward to form the middle column.

According to an embodiment, the magnetically permeable cavity body further comprises at least an upper shell, wherein the upper shell comprises an upper rim and a plurality of wings extended from the upper rim, wherein the middle column is extended from the upper rim and parallel thereto, wherein the middle column keeps gaps from the wings.

According to an embodiment, the magnetically permeable cavity body further comprises at least an upper shell, wherein an end of the upper shell extends outward to form at least a lower rim, wherein another end of the upper shell extends outward and upward to form the middle column.

According to an embodiment, the magnetically permeable cavity body further comprises at least an upper shell, wherein the upper shell comprises a lower rim and a plurality of wings extended from the upper rim, wherein the middle column is extended from the upper rim and parallel thereto, wherein the middle column keeps gaps from the wings.

According to an embodiment, the magnetic group is affixed and the magnetically permeable cavity body is arranged to be shiftable, so as to generate relative displacement between the middle column and the magnetic group.

According to an embodiment, the high power kinetic energy generating device further comprises at least a swinging mounting, wherein the magnetic group is arranged in the swinging mounting, such that when the swinging mounting is driven, the magnetic group will be displaced relatively to the middle column.

According to an embodiment, the swinging mounting is pivotally arranged in the magnetically permeable cavity body, so as for being driven to pivot and bring the magnetic group to displace synchronously.

According to an embodiment, the swinging mounting comprises at least a magnetic group holding groove and at least a magnetically permeable cavity body holding groove respectively arranged thereon, wherein the magnetic group is arranged in the magnetic group holding groove, wherein the magnetically permeable cavity body is arranged in the magnetically permeable cavity body holding groove.

According to an embodiment, the swinging mounting comprises at least a magnetic group lid, at least a mounting base, and at least a swing arm set, wherein the magnetic group lid has at least a lid coupling recess arranged thereon, wherein the magnetic group holding groove is formed on the mounting base, wherein the magnetic group is accommodated in the lid coupling recess, wherein the magnetic group lid is arranged in the magnetic group holding groove, wherein the swing arm set extends outward from the mounting base and forms the magnetically permeable cavity body holding groove along with the mounting base.

According to an embodiment, the magnetic group lid further comprises at least a lid coupling base plate and two lid coupling arms respectively extended outward from two sides of the lid coupling base plate to form the lid coupling recess.

According to an embodiment, the magnetically permeable cavity body has at least a bearing hole, wherein the swinging mounting has at least a rotation axle coupled with the bearing hole, such that the magnetically permeable cavity body and the swinging mounting are engaged with each other to allow the swinging mounting to pivot around the rotation axle relatively with the magnetically permeable cavity body.

According to an embodiment, the magnetically permeable cavity body further has at least a bearing hole, wherein the swing arm set comprises two extended arms having at least a rotation axle respectively on the inner side thereof, wherein the rotation axle is matchingly arranged in the bearing hole, so as to allow the swinging mounting to pivot around the rotation axle.

According to an embodiment, the high power kinetic energy generating device further comprises at least a holding sleeve for holding the magnetically permeable cavity body and at least a swinging mounting, wherein the magnetic group is arranged in the swinging mounting, wherein the swinging mounting is pivotally arranged on the holding sleeve, such that when the swinging mounting is driven, the magnetic group will be displaced relatively to the middle column.

According to an embodiment, the holding sleeve has at least a rotation axle, wherein the swinging mounting has at least a mounting recess coupled with the rotation axle, so as to allow the swinging mounting to pivot around the rotation axle relatively with the holding sleeve.

According to an embodiment, the holding sleeve comprises an upper rim groove, a middle column groove, and a lower rim groove respectively arranged on the side thereof facing the magnetic group, wherein the magnetically permeable cavity body comprises an upper rim extended from the inside of the upper rim groove to contact against the upper magnetically permeable member, wherein an end of the middle column extends from the inside of the middle column groove, wherein the magnetically permeable cavity body comprises a lower rim extended from the inside of the lower rim groove to contact against the lower magnetically permeable member.

According to an embodiment, the high power kinetic energy generating device further comprises at least a driving member, assembled or integrally formed with the swinging mounting, wherein the driving member is adapted for driving the swinging mounting to displace under external force.

According to an embodiment, the high power kinetic energy generating device further comprises at least a driving member, assembled or integrally formed with the swinging mounting, wherein the driving member is adapted for driving the swinging mounting to displace under external force.

According to an embodiment, the driving member is a reed.

According to an embodiment, the width of the magnetic gap is between 0.1-3 mm. It is understandable that the above width range shall not limit the present invention.

According to an embodiment, the high power kinetic energy generating device comprises two the magnetic groups, wherein the middle column passes through the magnetically permeable cavity body and connects with two the magnetic groups with the two ends thereof respectively.

According to an embodiment, the magnetically permeable cavity body further comprises at least an upper shell, two wings extended from the upper shell, a lower shell connected with two the wings, and the middle column, wherein the upper shell, the wings, and the lower shell jointly form the magnetically permeable cavity.

According to an embodiment, the magnetically permeable cavity has two openings respectively arranged on the two ends thereof, wherein the high power kinetic energy generating device further comprises two middle column holding brackets for respectively closing two the opening to form the magnetically permeable cavity, wherein each the middle column holding bracket has a middle column groove on the middle thereof, wherein the two ends of the middle column respectively pass through two the middle column grooves, so as to allow the middle column with the coil sleeved thereon to be accommodated in the magnetically permeable cavity, wherein the two ends of the middle column emerge from the magnetically permeable cavity body.

According to an embodiment, the upper shell, the wings, and the lower shell are made of magnetically permeable material, wherein two the middle column holding brackets are made of non-magnetically permeable material.

According to an embodiment, the high power kinetic energy generating device further comprises at least a swinging mounting pivotally arranged on the magnetically permeable cavity body, wherein the swinging mounting comprises at least a magnetically permeable cavity body groove and two magnetic group holding grooves respectively affixing the magnetically permeable cavity body and two the magnetic groups, such that the magnetically permeable cavity body stays motionless in the middle of the magnetically permeable cavity body groove and allows two the magnetic groups to move through the swinging of the swinging mounting, so as to generate electric power.

According to an embodiment, the high power kinetic energy generating device further comprises two the driving members arranged on the two sides of the swinging mounting respectively.

According to an embodiment, the magnetically permeable cavity body comprises a shaft socket arranged thereon, wherein the swinging mounting comprises a mounting rotation shaft arranged thereon coupling with the shaft socket.

According to an embodiment, the swinging mounting further comprises two magnetic group lids, two mounting bases, at least a swing arm set, wherein each the mounting base comprises two mounting base portions forming the magnetic group holding groove, wherein the swing arm set extended outward from two the mounting bases, so as to form the magnetically permeable cavity body groove with two the mounting bases, so as for the magnetically permeable cavity body to be accommodated in the magnetically permeable cavity body groove, wherein each the magnetic group is respectively arranged in at least a lid coupling recess formed by two the magnetic group lid, wherein each the magnetic group lid is arranged in each magnetic group holding groove respectively, so that two the magnetic group are affixed in the swinging mounting.

According to an embodiment, each the magnetic group lid further comprises at least a lid coupling base plate and two lid coupling arms respectively extended outward from the two ends of the lid coupling base plate to form the lid coupling recess, wherein the upper magnetically permeable member, the lower magnetically permeable member, and the permanent magnet member of each the magnetic group are interconnected and arranged in the lid coupling recess, wherein each the magnetic group lid is arranged in the magnetic group holding groove, wherein each the magnetic group is accommodated in each magnetic group holding groove respectively.

According to another aspect of the present invention, the present invention also provides a high power kinetic energy generating device, which comprises:

at least a covered magnetically permeable cavity body, comprising at least an upper magnetism seal lid and at least a lower magnetism seal lid to define a magnetically permeable cavity;

at least a middle column;

at least a permanent magnet member, jointly arranged between the upper magnetism seal lid and the lower magnetism seal lid; and at least a coil surrounding around the middle column, wherein both the coil and the permanent magnet member are arranged in the magnetically permeable cavity, wherein at least a magnetic gap is defined between the upper magnetism seal lid and the lower magnetism seal lid, wherein the middle column passes through the magnetic gap and is structured to alternately contact the upper magnetism seal lid and the lower magnetism seal lid, so as to alter the magnetic induction lines pass through the coil to generate at least an induced current.

According to an embodiment, the magnetically permeable shell further comprises at least a holding member to hold the upper magnetism seal lid and the lower magnetism seal lid, such that the upper magnetism seal lid and the lower magnetism seal lid form the magnetically permeable cavity.

According to an embodiment, the holding member is a clamp with at least a clamp slot to clamp and hold the upper magnetism seal lid and the lower magnetism seal lid therein.

According to an embodiment, the holding member comprises two clamp plates and a clamp connecting plate extended between two the clamp plates to form the clamp slot, wherein two the clamp plates are respectively connected with the upper magnetism seal lid and the lower magnetism seal lid.

According to an embodiment, the two clamp plates are respectively connected with the upper magnetism seal lid and the lower magnetism seal lid through matching to protruding points and attachment holes.

According to an embodiment, the high power kinetic energy generating device further comprises at least a coil framework with the coil surrounded thereon, wherein the middle column is held by the coil framework and sleeved by the coil, wherein the coil framework comprises a framework supporting point, so as to allow the middle column under external force to swing between the magnetic gaps by utilizing the framework supporting point as the swinging supporting point.

According to an embodiment, the coil framework further comprises at least an upper coil framework and at least a lower coil framework, wherein at least one the framework supporting point comprises an upper supporting point arranged at the center of the inner side of the upper coil framework and a lower supporting point arranged at the center of the inner side of the lower coil framework.

According to an embodiment, the coil framework comprises two lead wire columns, wherein the two ends of the wire that forms the coil are connected on the lead wire columns respectively.

According to an embodiment, the high power kinetic energy generating device further comprises at least a driving member, connected with at least an end of the middle column extended from the magnetically permeable cavity body.

According to an embodiment, the high power kinetic energy generating device comprises one the driving member, which is a reed connected with an end of the middle column.

According to an embodiment, the high power kinetic energy generating device comprises two the driving member, which are reeds, connected with the two ends of the middle column extended from the magnetically permeable cavity body respectively.

According to an embodiment, the magnetically permeable cavity body has two sides, wherein two the magnetic gaps are formed by the two sides respectively, wherein as an end of the middle column contacts the upper magnetism seal lid, the other end thereof contacts the lower magnetism seal lid.

According to an embodiment, the upper magnetism seal lid comprises two upper middle column contact ends extended downward from the edge thereof, wherein the lower magnetism seal lid comprises two lower middle column contact ends extended upward therefrom, wherein gaps left between corresponded the upper middle column contact ends and the lower middle column contact ends respectively become the magnetic gaps between the edges of the two sides of the upper magnetism seal lid and the lower magnetism seal lid.

According to an embodiment, the number of turns of the coil is 100~1200 turns, the range of the swing angle of the middle column is 1~10 degrees, and the range of the magnetic gap for the swinging of the middle column between the upper magnetism seal lid and the lower magnetism seal lid is 0.1~8 mm. It is understandable that the above numerical ranges shall not limit the present invention.

According to another aspect of the present invention, the present invention provides a kinetic energy generating method, which comprises the following steps:

driving the upper magnetically permeable members and the lower magnetically permeable members of the magnetic groups to respectively alternately contact the middle column in the magnetically permeable cavity body, so as for the coil surrounding around the middle column in the magnetically permeable cavity body to generate an induced current and produce electric power.

Further, the magnetic groups are driven to move relatively with the magnetically permeable cavity body, so as to make the upper magnetically permeable member and the lower magnetically permeable member to alternately contact the middle column in the magnetically permeable cavity body; or the magnetically permeable cavity body is driven to move relatively with the magnetic groups, so as to make the upper magnetically permeable member and the lower magnetically permeable member alternately contact the middle column in the magnetically permeable cavity body.

According to another aspect of the present invention, the present invention provides a kinetic energy generating method, which comprises the following steps:

allowing the swinging mounting to be driven to move by external force, such that the upper magnetically permeable members and the lower magnetically permeable members of the magnetic groups arranged on the swinging mounting will respectively alternately contact the middle column in the magnetically permeable cavity body, so as for the coil surrounding around the middle column in the magnetically permeable cavity body to generate an induced current and produce electric power.

Further, the swinging mounting is pivotally arranged in the magnetically permeable cavity body or pivotally arranged on the holding sleeve on the outside of the magnetically permeable cavity body.

According to another aspect of the present invention, the present invention provides a kinetic energy generating method, which comprises the following steps:

allowing the swinging mounting to be driven to move by external force, such that the upper magnetically permeable members and the lower magnetically permeable members of the two magnetic groups arranged on the swinging mounting will respectively alternately contact the two ends of the middle column in the magnetically permeable cavity body, so as for the coil surrounding around the middle column in the magnetically permeable cavity body to generate an induced current and produce electric power.

Further, the two driving members of the swinging mounting are respectively driven to drive the swinging mounting to pivot, so as to bring the magnetic groups in the swinging mounting to displace synchronously.

According to another aspect of the present invention, the present invention provides a kinetic energy generating method, which comprises the following steps:

driving a pair of opposite framework mountings of the middle column to pivotally move relatively with the coil framework, such that the two ends of the middle column will respectively alternately contact the upper magnetism seal lid and the lower magnetism seal lid at the two ends of the permanent magnet member, so that the direction of the magnetic induction lines that pass through the coil surrounding around the coil framework changes and renders the coil to generate an induced current.

Correspondingly, the upper magnetism seal lid and the lower magnetism seal lid hold the permanent magnet member and provide gaps respectively on the two sides to form the magnetic gaps. The middle column passes through the two magnetic gaps in a tilting manner and has the two ends thereof to swing in the magnetic gaps respectively.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments in the following are examples only and person skilled in the art can come out with other obvious alternatives. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "lower," "front," "back," "left," "right," "perpendicular," "horizontal," "top," "bottom," "inner," "outer," and more that indicate relations of direction or position are based on the relations of direction or position shown in the appended drawings, which is only for ease of describing the present invention and simplifying the description, rather than to indicate or imply that the referred device or element has to apply specific direction or to be operated or structured in specific direction. Therefore the above-mentioned terminologies shall not be interpreted as confine to the present invention.

It is understandable that terminology of "a/an" shall be referred to "at least one" or "one or more." In other words, the quantity of an element in an embodiment can be one, while the quantity of the element in another embodiment can be more. The terminology of "a/an" shall not be considered limitation of quantity.

FIGS. 1-9B illustrate a high power kinetic energy generating device according to a first preferred embodiment of the present invention. The high power kinetic energy generating device utilizes a magnetically permeable structure to enhance the density of magnetic field of the coil. It has the induction coil arranged on the coil limiting column in the magnetically permeable cavity, which has a magnetic group seal on the side thereof, so as to minimize the magnetic leakage of the magnetic circuit and to allow the coil to receive the maximum magnetic induction. There is a magnetic group moving up and down on a side of the magnetically permeable cavity, such that the entire coil will be completely covered by the magnetic induction lines and the magnetic leakage can be minimized. Hence, the coil can obtain the maximum change of magnetic flux during the movement of the magnetic group, so as to generate high powered induced current in the coil and achieve high electromagnetic transduction efficiency.

Figure 1A:
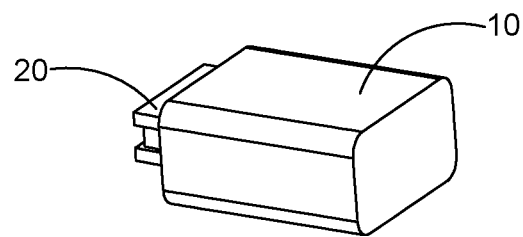
FIG. 1A is a perspective view of a high power kinetic energy generating device according to a first preferred embodiment of the present invention.
Figure 1B:
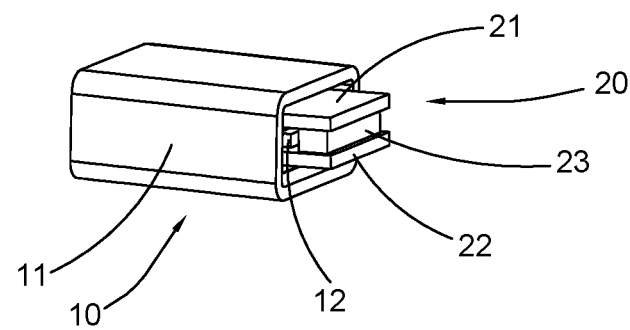
FIG. 1B is a perspective view of a high power kinetic energy generating device according to the above first preferred embodiment of the present invention.
Figure 2A:
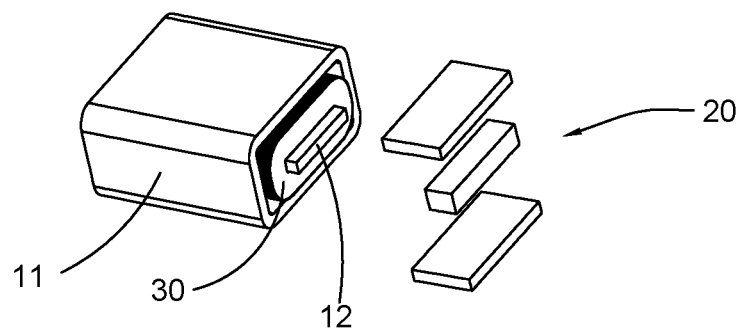
FIG. 2A is an exploded view of a high power kinetic energy generating device according to the above first preferred embodiment of the present invention.
Figure 2B:
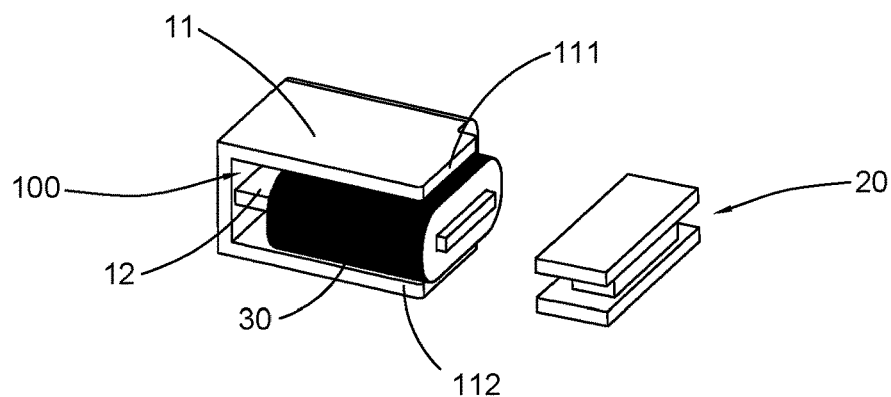
FIG. 2B is a sectional view of a high power kinetic energy generating device according to the above first preferred embodiment of the present invention.
Figure 2C:
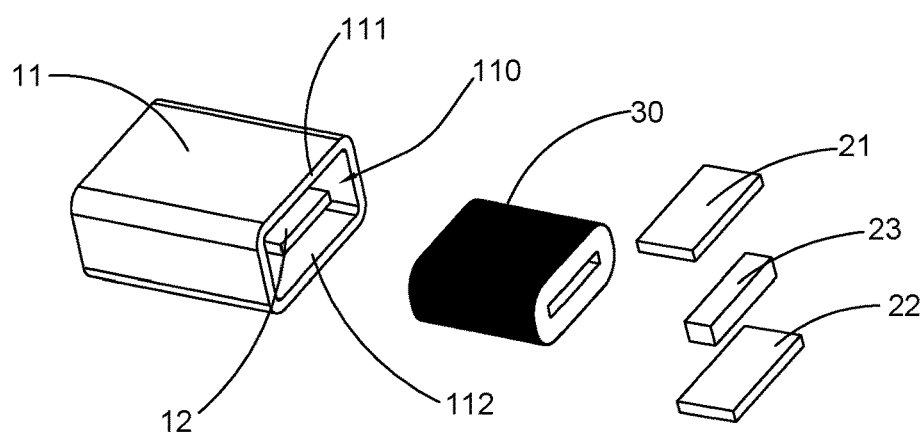
FIG. 2C is an exploded view of a high power kinetic energy generating device according to the above first preferred embodiment of the present invention.

Specifically, FIGS. 1A and 1B are perspective views of a high power kinetic energy generating device according to a first preferred embodiment of the present invention. The high power kinetic energy generating device comprises a magnetically permeable cavity body 10, a magnetic group 20, and a coil 30. The coil 30 is arranged in a magnetically permeable cavity 100 formed by the magnetically permeable cavity body 10. The magnetic group 20 moves up and down on a side of the magnetically permeable cavity body 10, so as to convert kinetic energy into electric power. More specifically, referring to FIGS. 2A-2C, the magnetically permeable cavity body 10 comprises a magnetically permeable shell 11 and a middle column 12 provided in the magnetically permeable shell 11. Both the middle column 12 and the magnetically permeable shell 1 contain magnetically permeable material and are assembled or integrally formed with each other, so as to enhance the magnetic permeability. The coil 30 is arranged in the magnetically permeable shell 11, inside of the magnetically permeable cavity 100, and around the middle column 12, such as directly sleeving on the middle column 12, sleeving on a coil framework that is arranged on the middle column 12, and etc. The magnetically permeable shell 11 has an opening 110 on one side thereof, while the rest sides thereof are shielded by magnetically permeable material. In other words, the magnetically permeable cavity body 10 forms a relatively enclosed magnetically permeable vessel. The coil 30 is accommodated in the magnetically permeable vessel and the opening 110 is embodied as a magnetic group seal. Therefore, when the magnetic group 20 is utilized to seal the opening 110, the coil 30 will be completely covered by the magnetic induction lines, such that magnetic leakage of the entire magnetic circuit can be reduced. That is to say, according to the present embodiment, the magnetically permeable cavity body 10 forms a close type of magnetically permeable cavity body that is relatively enclosed, so as to reduce magnetic leakage. It is understandable that the close type of magnetically permeable cavity body here may refer to an approximate closed state, a complete closed state, or a state that leaves relatively small gap(s).

Figure 3:
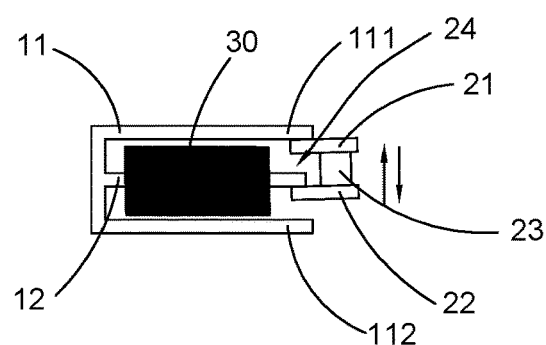
FIG. 3 is a perspective view illustrating displacement of a magnetic group and a magnetically permeable cavity body of the high power kinetic energy generating device according to the above first preferred embodiment of the present invention.

The magnetic group 20 further comprises a upper magnetically permeable member 21, a lower magnetically permeable member 22, and a permanent magnet member 23 arranged between the upper magnetically permeable member 21 and the lower magnetically permeable member 22. The upper magnetically permeable member 21 and the lower magnetically permeable member 22 respectively have an end thereof placing into the magnetically permeable cavity 100. Also, the upper magnetically permeable member 21 and the lower magnetically permeable member 22 respectively has a protruding portion relatively with the permanent magnet member 23 and a magnetic gap 24 between the protruding portions. The outer end of the middle column 12 is extended into the magnetic gap 24. The width between the upper magnetically permeable member 21 and the lower magnetically permeable member 22 is the width of the magnetic gap. It is understandable that the upper magnetically permeable member 21 and the lower magnetically permeable member 22 are respectively made of or covered by magnetically permeable material. The permanent magnet member 23 is made of permanent magnetic material, such as ferromagnet, alnico permanent magnetic material, FeCrCo permanent magnetic material, ferrite permanent magnetic material, rare earth permanent magnetic material, compound permanent magnetic material, and etc. Referring to FIG. 3, the upper magnetically permeable member 21 and the lower magnetically permeable member 22 alternately contact an upper rim 111 and a lower rim 112 of the magnetically permeable shell 11 under external force, such that the direction of the magnetic induction lines that pass through the coil 30 alter, so as to generate induced current in the coil 30.

Figure 4:
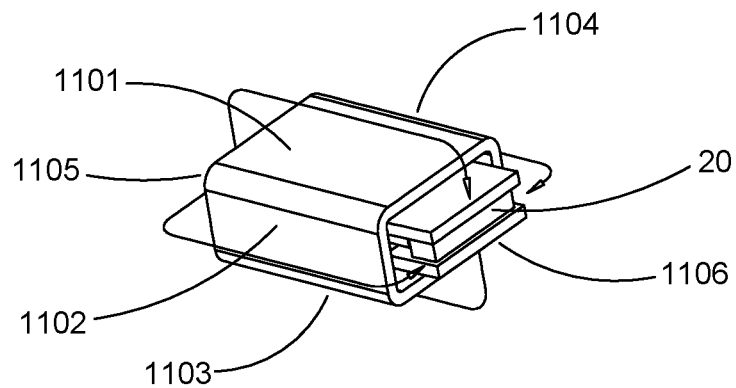
FIG. 4 is a perspective view of a high power kinetic energy generating device according to the above first preferred embodiment of the present invention.

Referring to FIG. 4, the magnetically permeable shell 11 has six sides 1101, 1102, 1103, 1104, 1105, and 1106, wherein the side 1101, 1102, 1103, 1104, and 1105 form a semi-close magnetically permeable shell body and the opening 110 of the side 1106 is filled up by the magnetic group 20, such that the magnetically permeable shell 11 can form the magnetically permeable cavity 100. The arrowhead lines in the figure refer to magnetic induction lines. It can be seen that the coil is arranged in the magnetically permeable cavity and a side thereof is close by the magnetic group, such that the coil can be completely covered by the magnetic induction lines, so as to minimize the magnetic leakage and generate more energy than regular conventional power generating device.

Figure 5A:
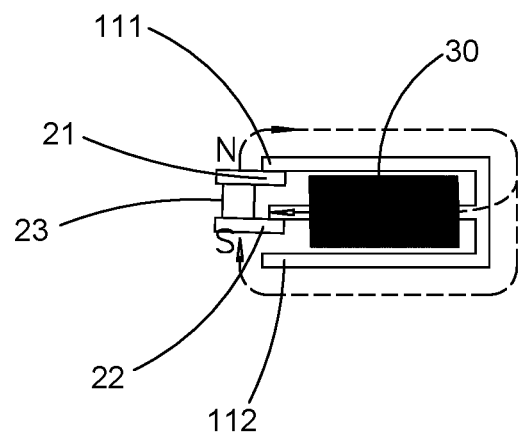
FIG. 5A is a perspective view illustrating an original state of a high power kinetic energy generating device according to the above first preferred embodiment of the present invention.
Figure 5B:
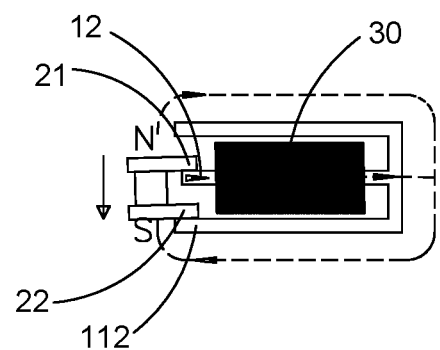
FIG. 5B is a perspective view illustrating electromagnetic induction as the magnetic group moves downward in the high power kinetic energy generating device according to the above first preferred embodiment of the present invention.

FIGS. 5A and 5B illustrate the operating principle of the high power kinetic energy generating device. The arrowhead dashed lines indicate the conducting directions of the magnetic induction lines. FIG. 5A illustrates a supposed original state. In the original state, the upper magnetically permeable member 21 is connected with the N-pole of the permanent magnet member 23 and contacts with the upper rim 111 of the magnetically permeable shell 11. The lower magnetically permeable member 22 is connected with the S-pole of the permanent magnet member 23 and contacts the middle column 12. At this time, the direction of the magnetic induction lines can be considered from the N-pole of the permanent magnet member 23 to the S-pole of the permanent magnet member 23. That is, the direction of the magnetic induction lines is from the upper rim 111 of the magnetically permeable shell 11 to the middle column 12. The magnetic induction lines are in a steady state and there is no induced current generated.

Referring to FIG. 5B, if the magnetic group 20 is moved downward along the direction of the arrow in the figure, it will eventually make the upper magnetically permeable member 21 connected with the N-pole of the permanent magnet member 23 contact the middle column 12 and make the lower magnetically permeable member 22 connected with the S-pole of the permanent magnet member 23 contact the lower rim 112 of the magnetically permeable shell 11. The direction of the magnetic induction lines that pass through the coil 30 will alter during the movement. As the arrow on the middle column 12 of FIG. 5B illustrated, the direction of the magnetic induction lines have changed from the "from right to left," as shown in FIG. 5A, into the "from left to right." This rapid change makes the coil 30 generate an induced current, which magnitude is directly related to parameters including the displacement speed of the magnetic group 20, the turn number of the coil 30, the permeability of the magnetically permeable material, the magnetic leakage, the magnetic saturation intensity, and etc.

The formula for induced electromotive is as follows.

$$E=-n*\Delta\Phi/\Delta t$$

In the formula, "E" refers to induced electromotive, "n" refers to the number of turn of the coil, and "ΔΦ/Δt" refers to the variance ratio of the magnetic flux.

It is understandable that when the magnetic group 20 moves from the position of FIG. 5B to the position of FIG. 5A, direction of the magnetic induction lines will change again, so as for the coil 30 to generate another induced current.

Besides, according to the embodiment illustrated in FIGS. 5A and 5B, the magnetically permeable cavity body 10 is anchored, while the magnetic group 20 is moved, so as to alter the magnetic induction lines passing through the coil 30 and generate induced current. It is understandable that, according to another alternative mode, it may also have the magnetic group 20 be anchored, while have the magnetically permeable cavity body 10 be moved, so as to alter the direction of the magnetic induction lines passing through the coil 30 and generate induced current.

It is understandable that the present embodiment of the present invention provides a kinetic energy generating method, which comprises the step of: driving the upper magnetically permeable member 21 and the lower magnetically permeable member 22 of the magnetic groups 20 to respectively alternately contact the middle column 12 provided in the magnetically permeable cavity body 10, so as for the coil 30 surrounding around the middle column 12 in the magnetically permeable cavity body 10 to generate an induced current and produce electric power.

Correspondingly, as the lower magnetically permeable member 22 contacts the middle column 12, the upper magnetically permeable member 21 can contact the upper rim 111 of the magnetically permeable cavity body 10, while when the upper magnetically permeable member 22 contacts the middle column 12, the upper magnetically permeable member 21 can contact the lower rim 112 of the magnetically permeable cavity body 10.

Further, the magnetic groups 20 are driven to move relatively with the magnetically permeable cavity body 10, so as to make the upper magnetically permeable member 21 and the lower magnetically permeable member 22 to alternately contact the middle column 12 in the magnetically permeable cavity body 10; or the magnetically permeable cavity body 10 is driven to move relatively with the magnetic groups 20, so as to make the upper magnetically permeable member 21 and the lower magnetically permeable member 22 alternately contact the middle column 12 in the magnetically permeable cavity body 10.

It is understandable that there can be various implementations to drive the magnetic group 20 or the magnetically permeable cavity body 10. The following will specifically describe an example of magnetic group driving device that drives the magnetic group 20 to displace.

Figure 6:
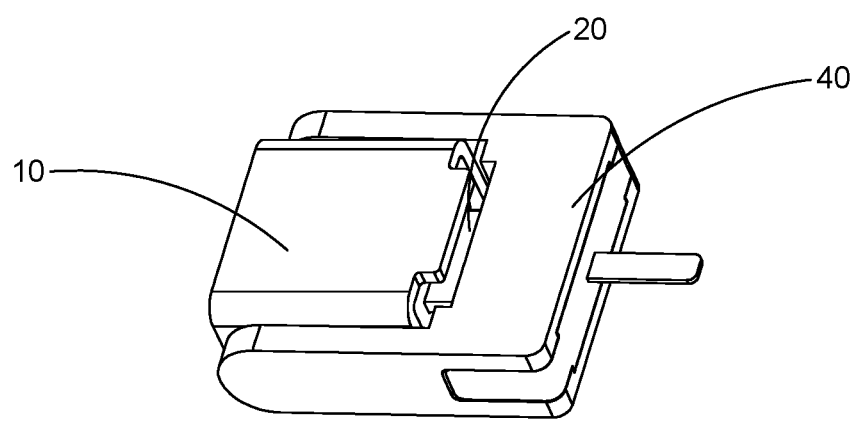
FIG. 6 is a perspective view of a high power kinetic energy generating device according to the above first preferred embodiment of the present invention.
Figure 7:
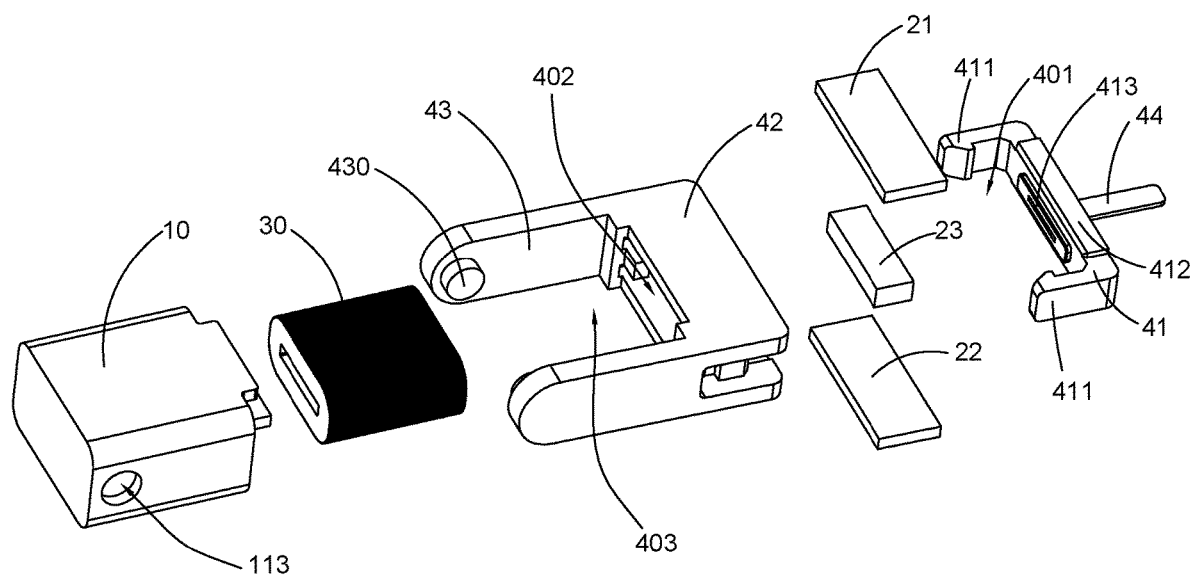
FIG. 7 is an exploded view of a high power kinetic energy generating device according to the above first preferred embodiment of the present invention.
Figure 8:
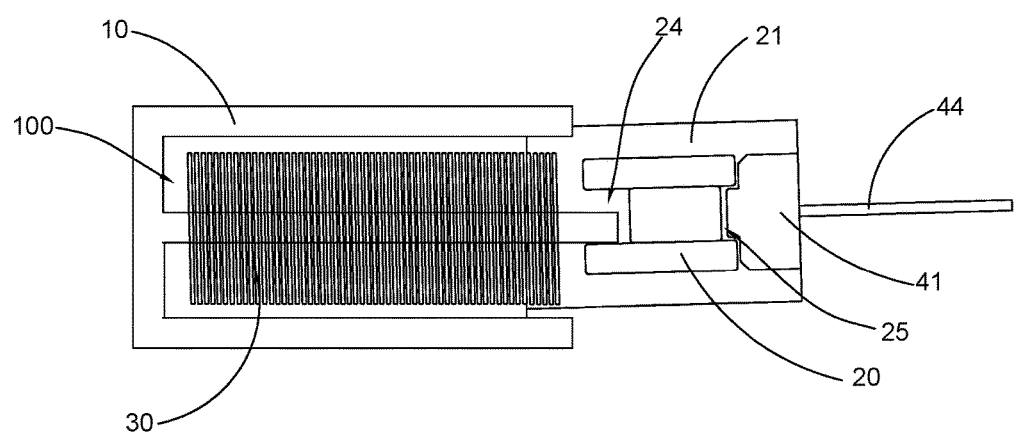
FIG. 8 is a side sectional view of a high power kinetic energy generating device according to the above first preferred embodiment of the present invention.

Further, in order to facilitate the exertion of external force on the high power kinetic energy generating device for driving the magnetic group 20 to displace relatively with the magnetically permeable cavity 100, the high power kinetic energy generating device further comprises a magnetic group driving device, as FIGS. 6-8 illustrated. According to this embodiment, it is embodied as a swinging mounting 40, wherein the magnetic group 20 is arranged in the swinging mounting 40. According to the embodiment illustrated in the figure, the magnetic group 20 is able to swing up and down with the breadth determined by the width of the magnetic gap. For example, it may swing up and down for electricity generation in an extent of 0.1~3 mm. Certainly, such numerical range shall not limit the present invention. That is to say, the function of the swinging mounting 40 is to hold the magnetic group 20 well, such that the magnetic group 20 respectively alternately contacts the upper rim 111 of the magnetically permeable shell 11, the middle column 12, and the lower rim 112 of the magnetically permeable shell 11 within the area of the magnetic gap.

Specifically, referring to FIGS. 7 and 8, the swinging mounting 40 further comprises a magnetic group lid 41, a mounting base 42, a swing arm set 43, and a driving member 44. The driving member 44 is connected with the magnetic group lid 41. The mounting base 42 comprises two mounting base portions to form a magnetic group holding groove 402. The swing arm set 43 is extended outward from the mounting base 42. The swing arm set 43 and the mounting base 42 form a magnetically permeable cavity body holding groove 403, such that the magnetically permeable cavity body 10 can be accommodated in the magnetically permeable cavity body holding groove 403. The swing arm set 43 includes two extended arms respectively having at least a rotation axle 430 on the inner side thereof. Correspondingly, the magnetically permeable shell 11 also has two bearing holes 113. Each the rotation axle 430 is arranged in the corresponding bearing hole 113, such that the magnetically permeable cavity body 10 can rotate around the rotation axle 430. It is understandable that the bearing hole 113 may also be arranged on the swing arm set 43 while the rotation axle 430 is arranged on the magnetically permeable shell 11.

The magnetic group 20 is arranged in a lid coupling recess 401 formed by the magnetic group lid 41 and the magnetic group lid 41 is arranged in the magnetic group holding groove 402, such that the magnetic group 20 is held in the swinging mounting 40. More specifically, the magnetic group lid 41 further comprises a lid coupling base plate 412 and two lid coupling arms 411 respectively extended outward from two sides of the lid coupling base plate 412 to form the lid coupling recess 401. The upper magnetically permeable member 21, the lower magnetically permeable member 22, and the permanent magnet member 23 of the magnetic group 20 are interconnected and arranged in the lid coupling recess 401. The magnetic group lid 41 is arranged in the magnetic group holding groove 402, such that the magnetic group 20 is accommodated in the magnetic group holding groove 402. The driving member 44 is connected with the magnetic group lid 41. More specifically, according to the present embodiment of the present invention, the driving member 44 is connected with the lid coupling base plate and embodied as a reed.

That is to say, referring to FIG. 8, the coil 30 is arranged in the magnetically permeable cavity 100 of the magnetically permeable cavity body 10 and sleeved on the middle column 12. The magnetic group lid 41 of the swinging mounting 40 arranges the magnetic group 20 in the magnetic group holding groove 402. The driving member 44 is connected on the magnetic group lid 41, such that the driving member 44 can drive the magnetic group 20 to displace and swing up and down, so as to generate induced currents in the coil 30.

In addition, the lid coupling base plate 412 can further form a protruding 413 on the inner side thereof. The upper magnetically permeable member 21 and lower magnetically permeable member 22 form a spacing gap 25 on the side thereof facing the lid coupling base plate 412. Then, the protruding 413 is placed into the spacing gap 25, so as to enhance the spacing and limiting of the magnetic group 20.

It is understandable that, according to the present embodiment of the present invention, the swinging mounting 40 is pivotally coupled with the magnetically permeable cavity body 10 and the magnetic group 20 is arranged in the swinging mounting 40, such that when the swinging mounting 40 is driven to pivot by external force, the magnetic group 20 in the swinging mounting 40 will be displaced relative to the magnetically permeable cavity body 10, so as to therefore generate induced current in the coil 30. More specifically, according to the present embodiment, the driving member 44 of the swinging mounting 40 can drive the entire swinging mounting 40 to displace under external force and execute the electricity generation. According to other implementation, there may be other structure that is suitable for the swinging mounting 40 to move under external force.

Person skilled in the art should be able to understand that, according to this embodiment, the structure that the magnetic group 20 is arranged, assembled, and limited in the swinging mounting is only an example, which shall not limit the present invention. In other words, person skilled in the art may also utilize other alternative implementation instead.

In addition, after the magnetically permeable cavity body 10 is assembled in the magnetically permeable cavity body holding groove 403 of the swinging mounting 40, the swinging mounting 40 and the magnetically permeable cavity body 10 form a closed accommodating chamber to accommodate the coil 30 and the magnetic group 20 in a compact structure.

Figure 9A:
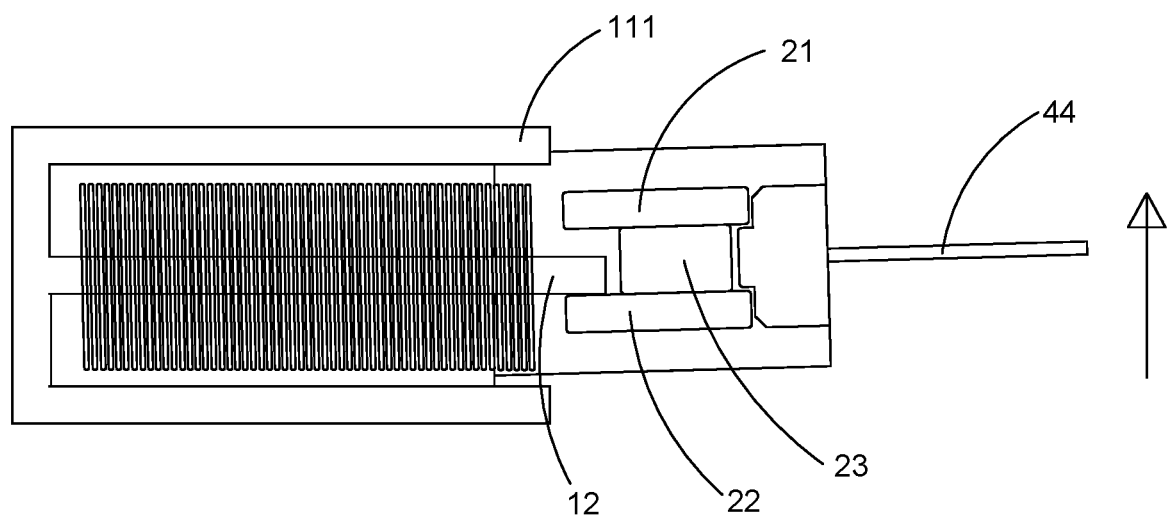
FIG. 9A illustrates the electromagnetic induction between the magnetic group and the coil as the magnetic group moves upward in the high power kinetic energy generating device of the above first preferred embodiment of the present invention.
Figure 9B:
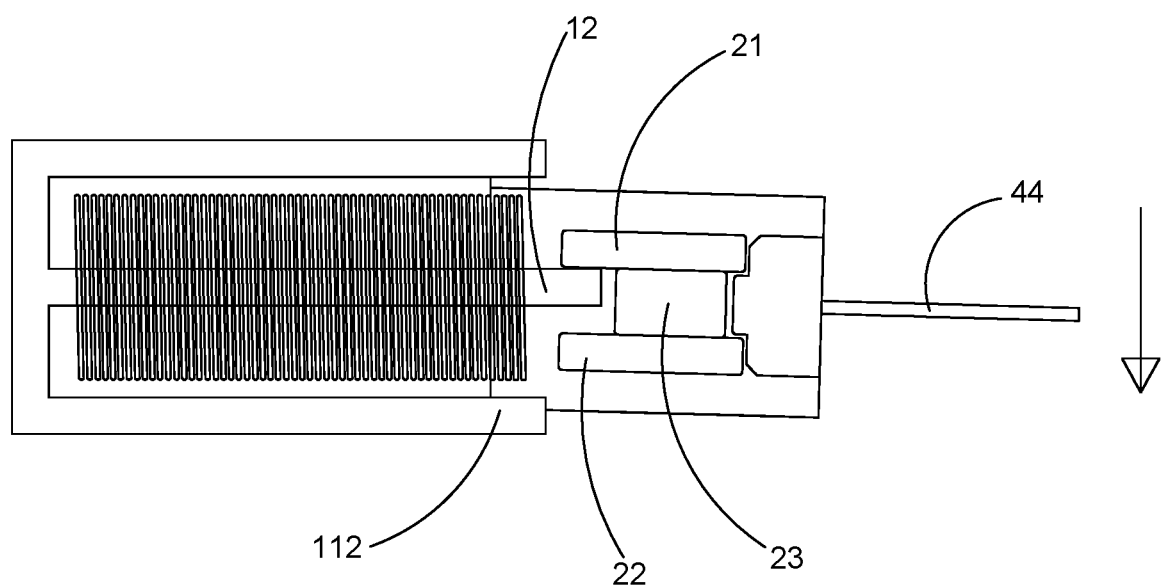
FIG. 9B illustrates the electromagnetic induction between the magnetic group and the coil as the magnetic group moves downward in the high power kinetic energy generating device of the above first preferred embodiment of the present invention.

In other words, as FIGS. 9A and 9B illustrated, if the driving member 44 is at the pole position of an upward swinging, the upper magnetically permeable member 21 will be connected with the N-pole of the permanent magnet member 23. The lower magnetically permeable member 22 is connected with the S-pole of the permanent magnet member 23 and contacts the middle column 12. At this time, the direction of the magnetic induction lines can be considered from the N-pole of the permanent magnet member 23 to the S-pole of the permanent magnet member 23. That is, the direction of the magnetic induction lines is from the upper rim 111 of the magnetically permeable shell 11 to the middle column 12. The magnetic induction lines are in a steady state and there is no induced current generated. When the driving member 44 swings down due to external force, the upper magnetically permeable member 21 connected with the N-pole of the permanent magnet member 23 will contact the middle column 12. During the movement, the magnetic induction lines that pass through the coil 30 will alter and this rapid change makes the coil generate induced current. Person skilled in the art should be able to understand that when the driving member 44 swings up again, the direction of the magnetic induction lines that pass through the coil 30 will change again. The rapid change makes the coil 30 to continue generating induced current. According to this embodiment, the upper magnetically permeable member 21 and the lower magnetically permeable member 22 do not have to respectively contact the upper rim 111 and the lower rim 112 of the magnetically permeable shell 11. Certainly, according to some alternative mode, the upper magnetically permeable member 21 and the lower magnetically permeable member 22 may also be extended into the magnetically permeable cavity body 10 and respectively contact the upper rim 111 and the lower rim 112 of the magnetically permeable shell 11 during the electricity generating operation.

Correspondingly, a kinetic energy generating method provided by the present preferred embodiment of the present invention comprises the following step:

allowing the magnetic group driving device to be driven to move by external force, such that the upper magnetically permeable member 21 and the lower magnetically permeable member 22 of the magnetic groups 20 arranged on the magnetic group driving device will respectively alternately contact the middle column 12 in the magnetically permeable cavity body 10, so as for the coil 30 surrounding around the middle column 12 in the magnetically permeable cavity body 10 to generate an induced current and produce electric power.

Correspondingly, according to this embodiment, the magnetic group driving device is embodied as a swinging mounting 40, such that when the swinging mounting 40 is driven by external force to pivot relatively to the magnetically permeable cavity body 10, the magnetic group 20 will be driven to displace.

Further, the driving member 44 of the swinging mounting 40 is driven to drive the swinging mounting to pivot, so as to bring the magnetic group 20 in the swinging mounting 40 to displace synchronously.

Figure 10A:
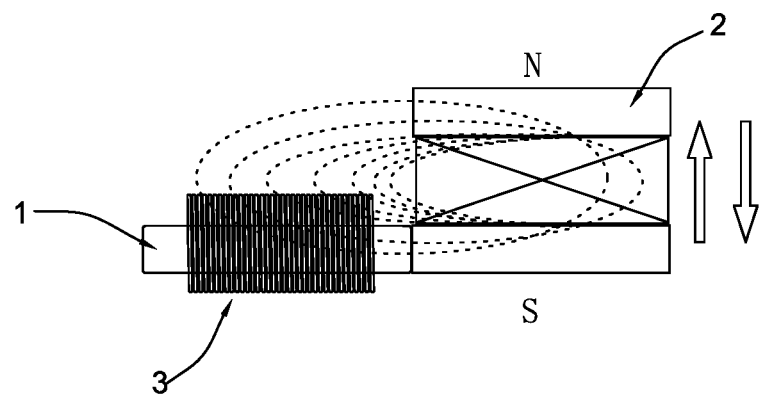
FIG. 10A is a perspective view of a PRIOR ART illustrating the electromagnetic induction of a regular kinetic electricity generation device.
Figure 10B:
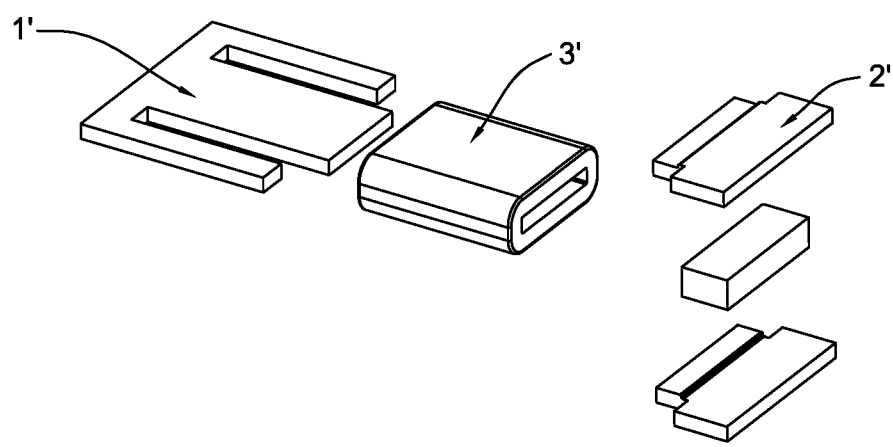
FIG. 10B is an exploded view of a PRIOR ART illustrating the electricity generation structure of a regular type E device.
Figure 10C:
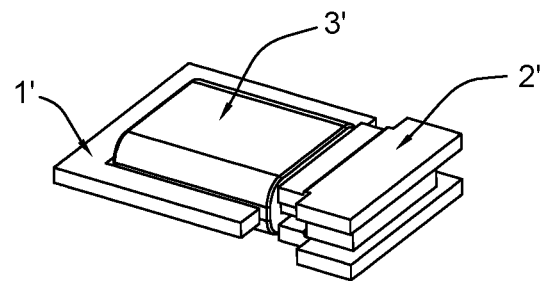
FIG. 10C is a perspective view of a PRIOR ART illustrating the electricity generation structure of a regular type E device.

FIGS. 10A-10C are regular kinetic electricity generation device according to prior art. The comparison of the preferred embodiment of the present invention to regular conventional kinetic electricity generation device reflects that the device of the present invention is advantageous in smaller size, stronger energy, low required pressing force, and etc.

FIG. 10A illustrates the operating principle of electricity generation of a conventional mechanical kinetic electricity generation device. According to this conventional structure, an iron core 1 made of magnetically permeable material passes through the center of a coil 3. Then the iron core 1 made of magnetically permeable material alternately glides between the two poles of a magnetic group 2 to generate energy. Because the is only one stick of magnetically permeable object passing through the coil 3, drawbacks of such device includes low magnetic permeability, high magnetic leakage, and etc., and only limited energy can be generated thereby. The dashed line in FIG. 10A refers to the area of influence of the magnetic induction lines, which shows that because the outer side of the coil 3 is farther from the magnetic group 2 and the influence of the magnetic field to the conductor farther from the magnetic group 2 will be weaker, this portion of the coil will receive minimum influence from the magnetic induction lines. As a result, such regular conventional electricity generation device can only generate weak induced electromotive and generate electricity inefficiently. Hence, in contrast with such prior art, the electromagnetic transduction efficiency of the device according to the present invention has been enhanced by four times and the size of the device has been reduced by half under the same conditions of pressing force (e.g. 3N) and displacement breadth (e.g. 0.5 mm).

FIGS. 10B and 10C are perspective views illustrating the components of conventional electricity generation structure of a regular type E device. Referring to the figures, an E-shaped iron core 1' of the regular type E electricity generation device is inserted into the inner of a coil 3' and a magnetic group 2' is connected to the coil 3'. Comparing to previous conventional device that inserts a straight iron core into the coil, the regular type E electricity generation device that utilizes an E-shaped iron core 1' does somehow increase the utilization of the magnetic energy, though it is still relatively low. It is because the magnetic induction lines still cannot be completely concentrated to the surrounding of the coil, which leaves great magnetic leakage and increases not much efficiency. Nonetheless, the high power kinetic energy generating device of the present invention, in contrasting with the regular type E electricity generation device, increases the electricity generation efficiency for two times and reduces the size by half.

Figure 11:
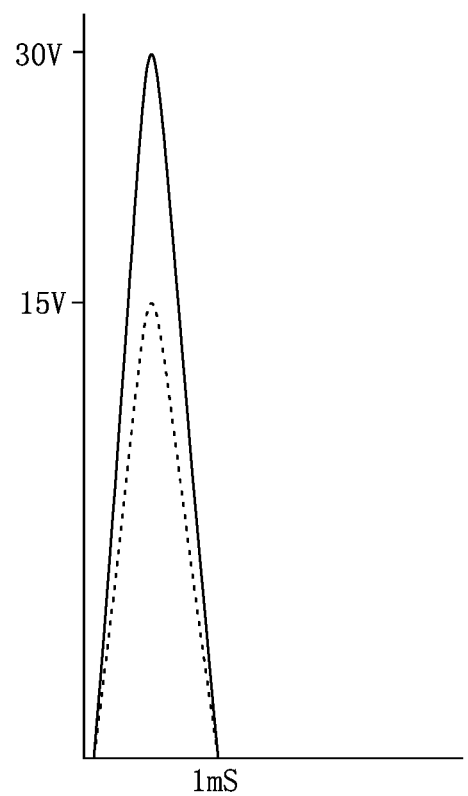
FIG. 11 is a comparison diagram illustrating the energies produced by a conventional kinetic electricity generation device and the high power kinetic energy generating device of the present invention under the same parameters.
Figure 12A:
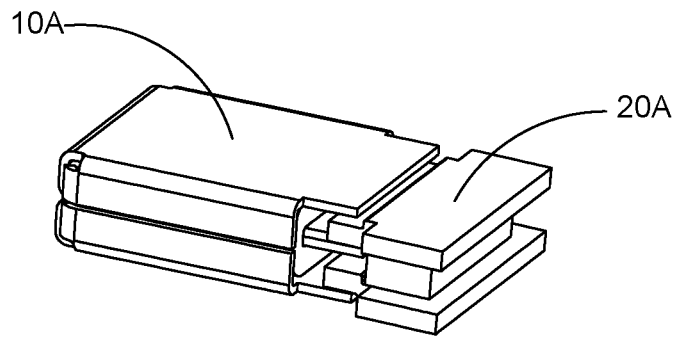
FIGS. 12A and 12B are perspective views of a high power kinetic energy generating device according to a second preferred embodiment of the present invention.
Figure 12B:
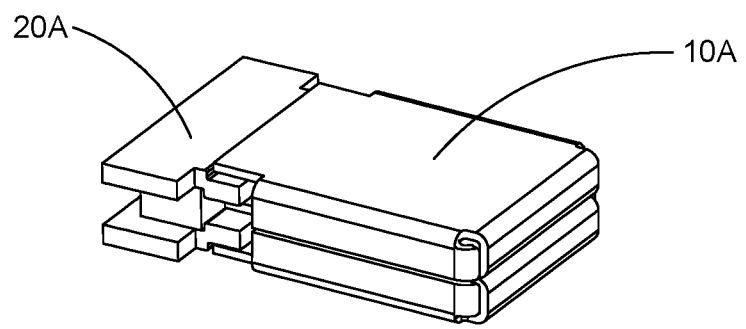

FIG. 11 is a comparison diagram illustrating the energies produced by a conventional kinetic electricity generation device and the high power kinetic energy generating device of the present invention under the same parameters. The solid line refers to the energy produced by the high power kinetic energy generating device of the present invention, whereas the dashed line refers to the energy produced by a conventional kinetic electricity generation device. It can be seen in the comparison and test on the energies produced by a conventional kinetic electricity generation device and the high power kinetic energy generating device of the present invention that device of the present invention produces much greater energy than a conventional kinetic electricity generation device under the same parameters (i.e. same pressing force, same displacement breadth, same displacement speed, same number of turns of coil, same magnetic flux, and same magnetically permeable material). Hence, the device of the present invention can have a much smaller size than a conventional kinetic electricity generation device in producing the same energy, which greatly enhances the industrial usability and widens the application of the present invention.

Hence, the present invention provides a small and compact device with great output energy, which may supply power for remote controls, low-power consumption communication circuits, sensors, and etc. For example, the device of the present invention that is as small as 1.5 cubic centimeters can produce 400-700 u of energy under 2N of pressing force and 1.2 of displacement breadth. With a much smaller size, it can be installed in the inside of various sensor products, so as to allow these electronic products to work intermittently for a few decades long.

FIGS. 12A-16 illustrate the high power kinetic energy generating device according to a second preferred embodiment of the present invention. It is mainly an alternative mode for the magnetically permeable cavity body 10 and the swinging mounting 40 of the above first preferred embodiment.

The magnetically permeable shell 11 and the middle column 12 of the magnetically permeable cavity body 10 are integrally formed according to the above first preferred embodiment. Nonetheless, according to this preferred embodiment, the high power kinetic energy generating device comprises a magnetically permeable cavity body 10A formed by two segments coupling with each other in a top down manner, so as to construct and form a magnetically permeable cavity 100A.

Specifically, the magnetically permeable cavity body 10A comprises an upper half cavity body shell 11A, a lower half cavity body shell 14A, and a middle column 12A. The middle column 12A is also an top-bottom assembly, which comprises an upper middle column portion 121A extended from the upper half cavity body shell 11A and a lower middle column portion 122A extended from the lower half cavity body shell 14A. Certainly, the middle column 12A may also be an integral component, rather than having the upper and lower portions as shown in the figure. More specifically, the upper half cavity body shell 11A comprises an upper shell body 111A and three upper wings 112A, 113A, and 114A extended therefrom. The upper middle column portion 121A is extended from the upper wing 112A and opposite to the upper shell body 111A. Gaps are respectively left between the two sides of the upper middle column portion 121A and the upper wings 113A and 114A, such that the upper wings 112A, 113A, and 114A, the upper shell body 111A, and the upper middle column portion 121A form a upper magnetically permeable cavity 101A together. Correspondingly, the lower half cavity body shell 14A comprises an lower shell body 141A and three lower wings 142A, 143A, and 144A extended therefrom. The lower middle column portion 122A is extended from the lower wing 142A and opposite to the lower shell body 141A. Gaps are respectively left between the two sides of the lower middle column portion 122A and the lower wings 143A and 144A, such that the lower wings 142A, 143A, and 144A, the lower shell body 141A, and the lower middle column portion 122A form a lower magnetically permeable cavity 102A together. Hence, the upper magnetically permeable cavity 101A and the lower magnetically permeable cavity 102A can form the magnetically permeable cavity 100A.

Figure 13A:
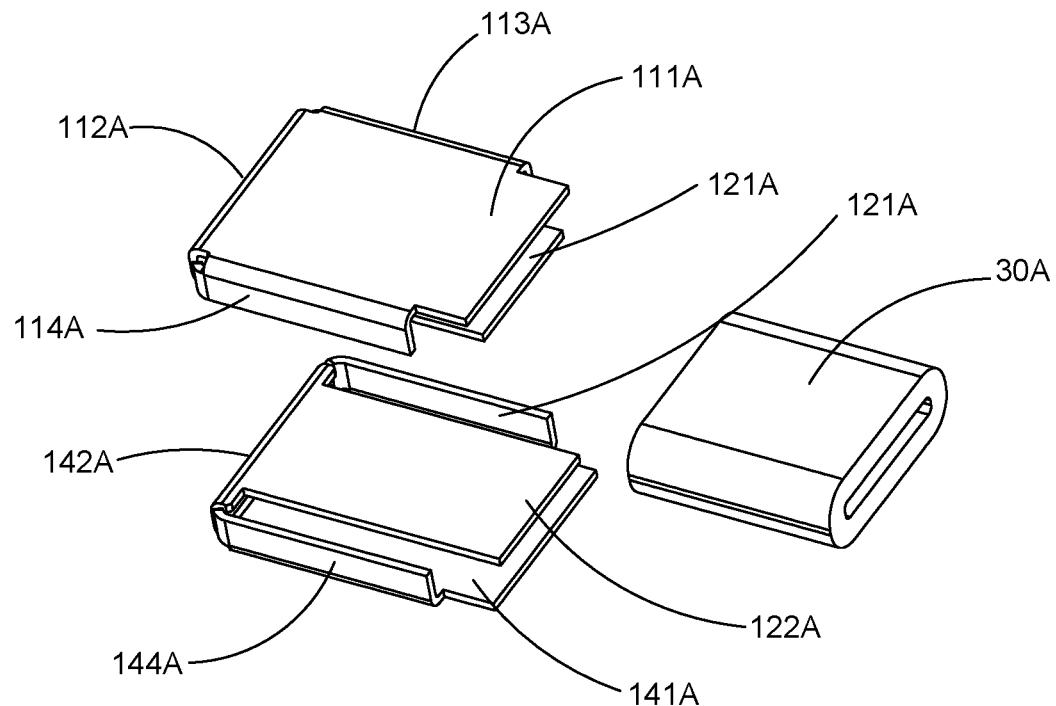
FIG. 13A is an exploded view of the high power kinetic energy generating device according to the above second preferred embodiment of the present invention.
Figure 13B:
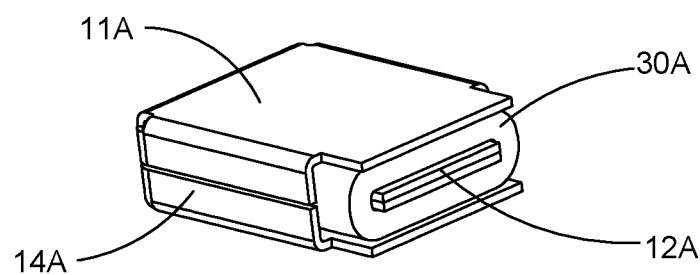
FIG. 13B is a perspective view of the high power kinetic energy generating device according to the above second preferred embodiment of the present invention.

Referring to FIG. 13, a coil 30A of the high power kinetic energy generating device is arranged in the magnetically permeable cavity 100A of the magnetically permeable cavity body 10A and sleeved on the middle column 12A. The three upper wings 112A, 113A, and 114A and the upper shell body 111A of the upper half cavity body shell 11A and the three lower wings 142A, 143A, and 144A and the lower shell body 141A of the lower half cavity body shell 14A cover and wrap all around the coil 30A, so as to reduce magnetic leakage.

Figure 14:
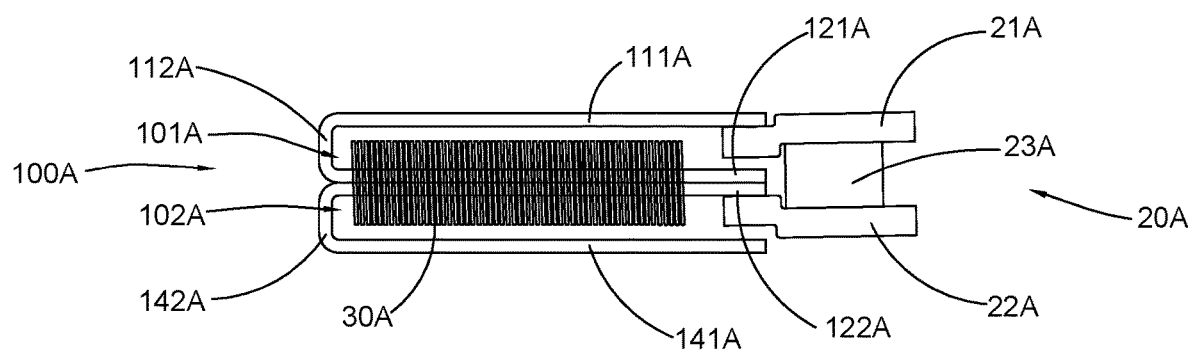
FIG. 14 is a side sectional view of the high power kinetic energy generating device according to the above second preferred embodiment of the present invention.

Referring to FIG. 14, the structure of a magnetic group 20A of the high power kinetic energy generating device is similar with the structure of the magnetic group 20 according to the above first preferred embodiment of the present invention. The magnetic group 20A comprises an upper magnetically permeable member 21A, a lower magnetically permeable member 22A, a permanent magnet member 23A and a magnetic gap 24A formed thereamong. The permanent magnet member 23A is arranged between the upper magnetically permeable member 21A and the lower magnetically permeable member 22A. The upper magnetically permeable member 21A and the lower magnetically permeable member 22A respectively have an end thereof inserted in the magnetically permeable cavity 100A. The upper magnetically permeable member 21A and the lower magnetically permeable member 22A alternately contact the middle column 12A and respectively hit an upper rim 1110A outward extended from the upper shell body 111A of the upper half cavity body shell 11A and a lower rim 1410A outward extended from the lower shell body 141A under external force, such that the direction of the magnetic induction lines that pass through the coil 30A alter, so as to generate induced current in the coil 30A. Person skilled in the art should be able to understand that the operating principle of the electricity generation of the high power kinetic energy generating device of the present preferred embodiment of the present invention is the same with it of the previous preferred embodiment of the present invention.

Figure 15:
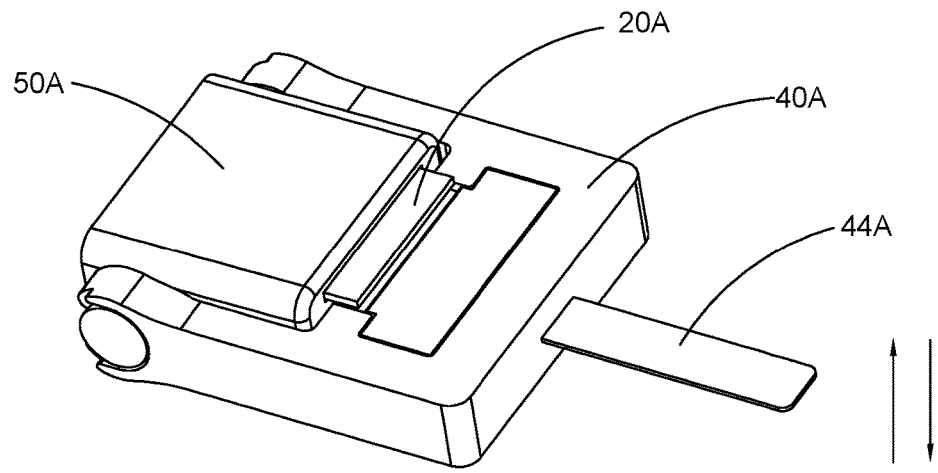
FIG. 15 is a perspective view of a high power kinetic energy generating device according to the above second preferred embodiment of the present invention.
Figure 16:
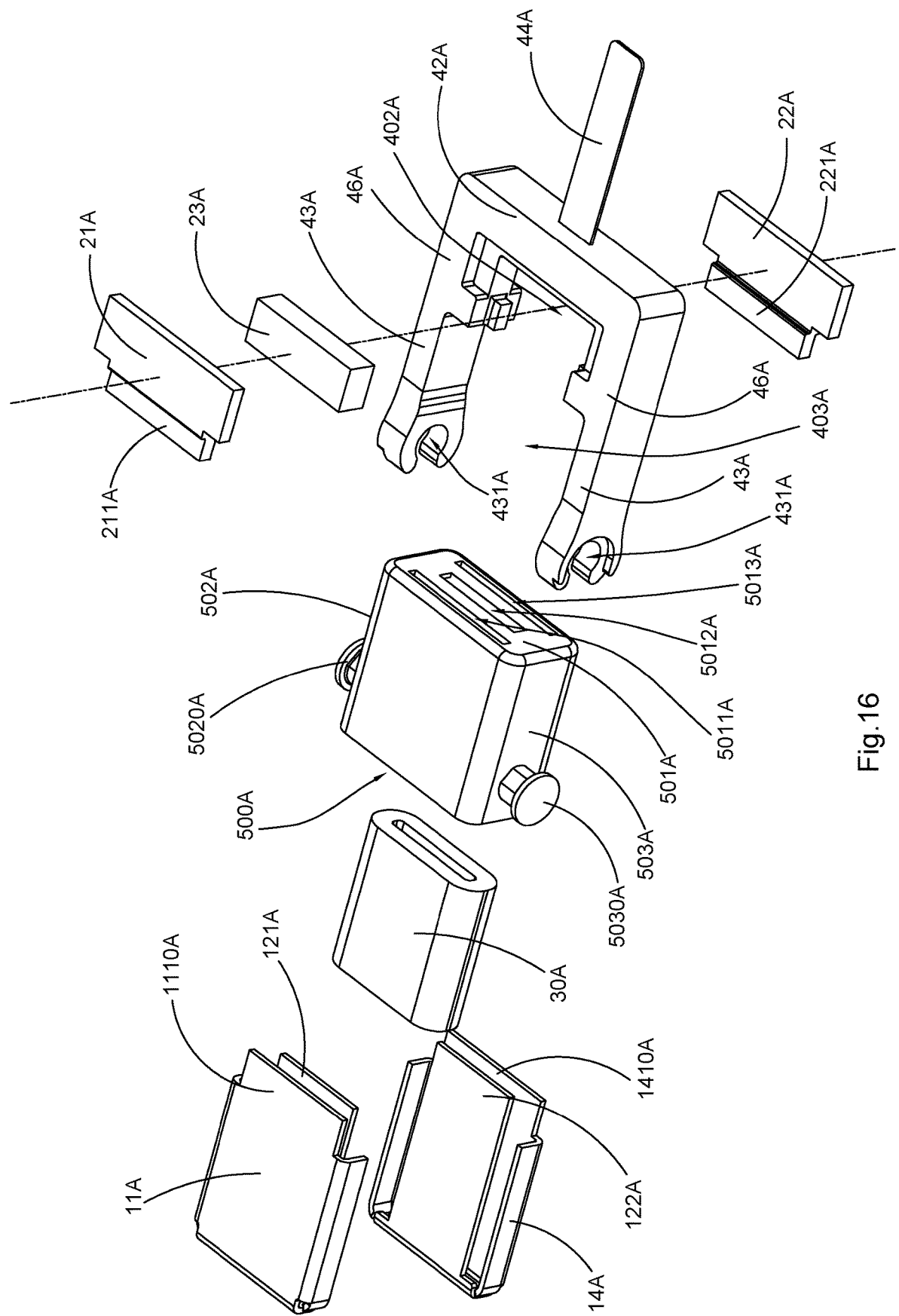
FIG. 16 is an exploded view of a high power kinetic energy generating device according to the above second preferred embodiment of the present invention.
Figure 17:
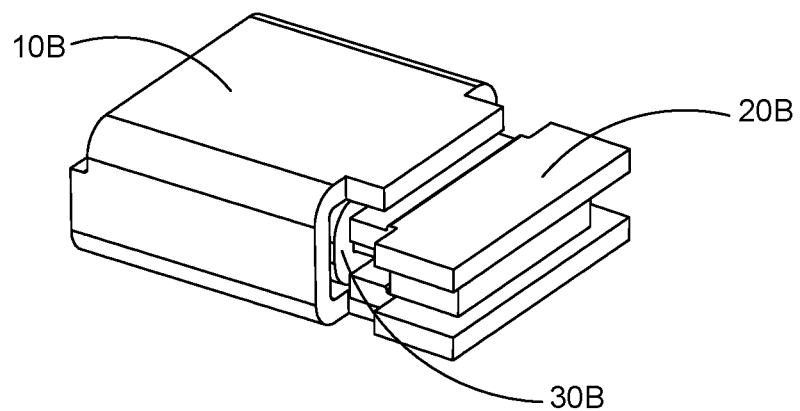
FIG. 17 is a perspective view of a magnetically permeable cavity body according to an alternative mode of the above second preferred embodiment of the present invention.
Figure 18:
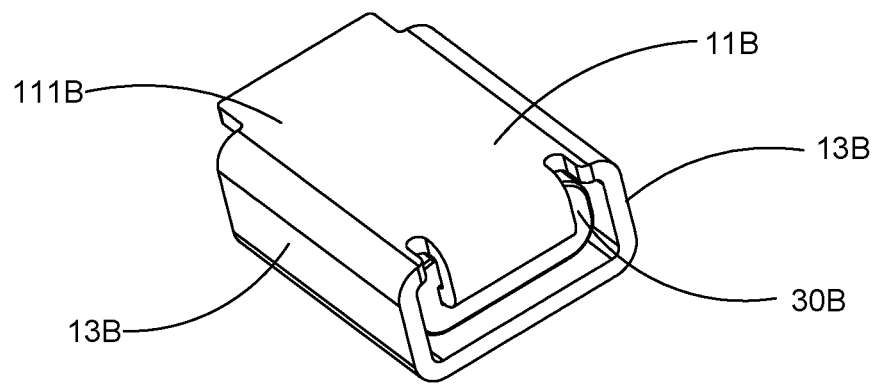
FIG. 18 is a perspective view of a magnetically permeable cavity body according to an alternative mode of the above second preferred embodiment of the present invention.
Figure 19:
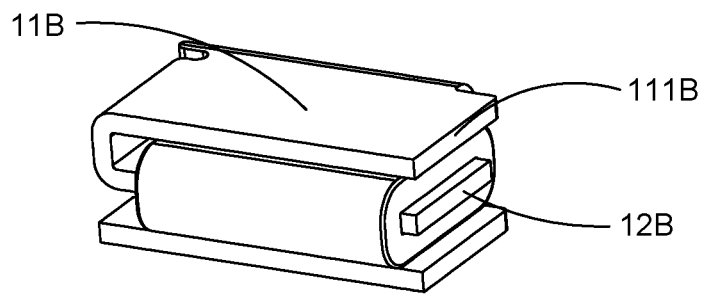
FIG. 19 is a sectional view of FIG. 18 along an A-A line.
Figure 20:
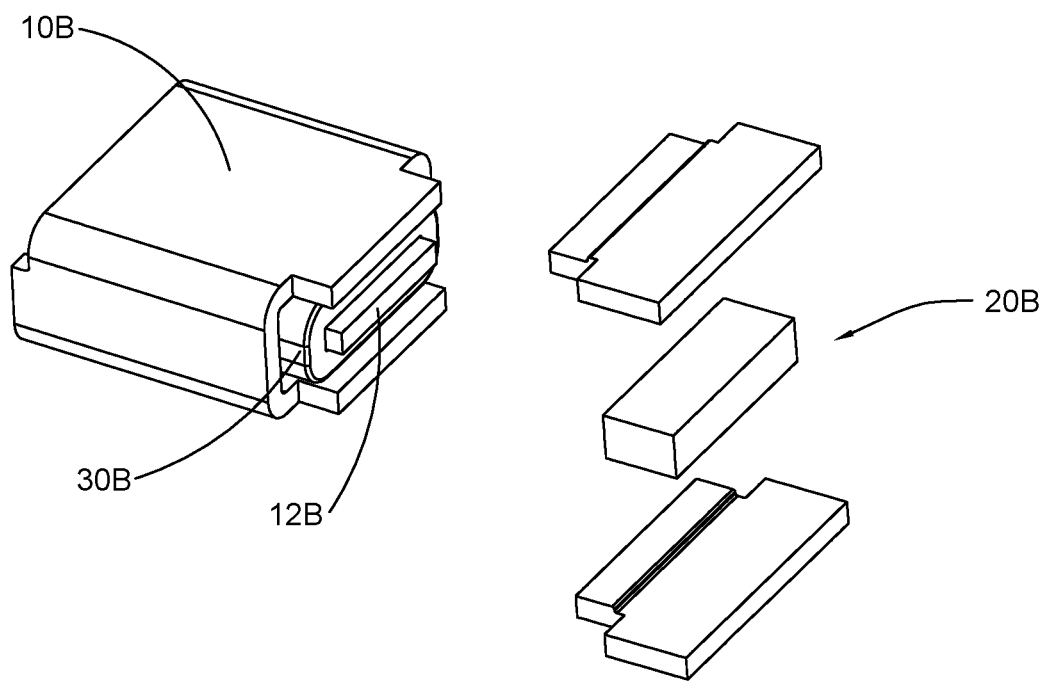
FIG. 20 is a perspective view of a magnetically permeable cavity body according to an alternative mode of the above second preferred embodiment of the present invention.

FIGS. 15 and 16 illustrate electricity generation by means of the high power kinetic energy generating device that has a swinging mounting 40A connected with the magnetic group 20A. That is to say, the swinging mounting 40A holds the magnetic group 20A, such that the magnetic group 20A respectively alternately contacts the upper rim 1110A of the upper half cavity body shell 11A, the middle column 12A, and the lower rim 1410A of the lower half cavity body shell 14A within the area of the magnetic gap.

Specifically, the swinging mounting 40A comprises a mounting base 42A, a swing arm set 43A, and a magnetic group steady arm set 46A. The high power kinetic energy generating device further comprises a driving member 44A. The driving member 44A is integrally connected with the swinging mounting 40A. Specifically speaking, the driving member 44A is integrally connected with the mounting base 42A. The magnetic group steady arm sets 46A are respectively extended outward from the two ends of the mounting base 42A. Then, the magnetic group steady arm sets 46A and the mounting base 42A form a magnetic group holding groove 402A. The upper magnetically permeable member 21A, the lower magnetically permeable member 22A, and the permanent magnet member 23A of the magnetic group 20A are interconnected and arranged in the magnetic group holding groove 402A. The swing arm sets 43A are respectively extended outward from the magnetic group steady arm sets 46A and respectively form a mounting recess 431A on the end thereof. The swing arm set 43A has a magnetically permeable cavity body holding groove 403A formed therein, so as for accommodating the magnetically permeable cavity body 10A.

The high power kinetic energy generating device further comprises a holding sleeve 50A for holding and affixing the upper half cavity body shell 11A, the lower half cavity body shell 14A, and the coil 30A. The holding sleeve 50A has an opening 500A. The magnetically permeable cavity body 10A and the coil 30A can be put into the holding sleeve 50A via the opening 500A. The holding sleeve 50A comprises an upper rim groove 5011A, a middle column groove 5012A, and a lower rim groove 5013A on a side 501A thereof facing the opening 500A. The upper rim 1110A of the magnetically permeable cavity body 10A can be extended from the inside of the upper rim groove 5011A to contact an upper magnetically permeable member contact end 211A that is integrally extended outward from the upper magnetically permeable member 21A. An end of the middle column 12A can be extended out from the middle column groove 5012A to contact the permanent magnet member 23A. The lower rim 1410A of the magnetically permeable cavity body 10A can be extended from the inside of the lower rim groove 5013A to contact a lower magnetically permeable member contact end 221A that is integrally extended outward from the lower magnetically permeable member 22A. Hence, the coil 30A of the magnetically permeable cavity body 10A can be affixed and held in the inside of the holding sleeve 500A and the magnetically permeable cavity body 10A can contact the magnetic group 20A. It is understandable that the contact ends 211A and 221A that are respectively integrally extended from the upper magnetically permeable member 21A and the lower magnetically permeable member 22A may keep a shorter distance from each other than it of the two sides of the permanent magnet member 23A, as FIG. 14 illustrated. Certainly, this shape is exemplar only, which shall not limit the present invention.

The holding sleeve 500A further comprises two mounting rotation shafts 5020A and 5030A respectively arranged on the other two sides 502A and 503A thereof. The mounting recesses 431A of the swinging mounting 40A can be respectively fit on the mounting rotation shafts 5020A and 5030A, so as to allow the swinging mounting 40A to slightly swing up and down by the mounting rotation shafts 5020A and 5030A. Therefore, the swinging mounting 40A can bring the magnetic group 20A to alternately contact the upper rim 1110A of the magnetically permeable cavity body 10A and the middle column 12A of the lower rim 1410A.

The swinging mounting 40A is pivotally arranged on the holding sleeve 50A, which specific structure, however, shall not be limited by the above mentioned means of mounting rotation shafts and mounting recesses. When the swinging mounting 40A pivots relatively to the holding sleeve 50A, the magnetic group 20A will be driven to alternately contact the middle column 12A, so as to generate induced current in the coil 30A.

That is to say, referring to FIG. 16, the coil 30A is arranged in the magnetically permeable cavity 100A of the magnetically permeable cavity body 10A and sleeved on the middle column 12A. The swinging mounting 40A arranges the magnetic group 20A in the magnetic group holding groove 402A. The driving member 44A is assembled or integrally formed so as to be connected on the swinging mounting 40A, such that the swinging of the driving member 44A can drive the magnetic group 20A to displace and swing up and down, so as to generate induced electromotive in the coil 30A. Person skilled in the art should be able to understand that the operating principle of the electricity generation in the present preferred embodiment of the present invention is the same with it of the above first preferred embodiment of the present invention.

The assembling of the high power kinetic energy generating device according to the above embodiment includes the following steps: (1) coupling the upper half cavity body shell 11A and the lower half cavity body shell 14A to form the magnetically permeable cavity 100A; (2) sleeving the coil 30A on the middle column 12A; (3) arranging the magnetically permeable cavity body 10A and the coil 30A in the holding sleeve 500A; (4) respectively extending and protruding the upper rim 1110A, the lower rim 1410A, and the middle column 12A from the three grooves 5011A, 5012A, and 5013A of the holding sleeve 500A for contacting the magnetic group 20A; (5) integrally forming the driving member 44A and the swinging mounting 40A; (6) placing the upper magnetically permeable member 21A, the permanent magnet member 23A, and the lower magnetically permeable member 22A in the magnetic group holding groove 402A; (7) mounting the two mounting recesses 431A of the swinging mounting 40A on the mounting rotation shafts 5020A and 5030A respectively, so as to allow the swinging mounting 40A to slightly swing up and down by utilizing the mounting rotation shafts 5020A and 5030A as the swinging supporting point, such that the swinging mounting 40A can drive the magnetic group 20A to alternately contact the upper rim 1110A of the magnetically permeable cavity body 10A, the lower rim 1410A, and the middle column 12A.

FIGS. 17-20 illustrate the high power kinetic energy generating device according to a second preferred embodiment of the present invention. It is mainly another alternative mode for the magnetically permeable cavity body 10 of the above first preferred embodiment. In other words, a middle column 12B of a magnetically permeable cavity body 10B in the present embodiment is formed by bending the magnetically permeable material of a side of the magnetically permeable cavity body 10 of the above first preferred embodiment. Such structure is easy to be manufactured and benefit to lower the production costs.

Specifically, referring to FIGS. 17-20, the high power kinetic energy generating device comprises a magnetically permeable cavity body 10B, a magnetic group 20B, and a coil 30B. The coil 30B is arranged in a magnetically permeable cavity 100B formed by the magnetically permeable cavity body 10B. The magnetic group 20B moves up and down on a side of the magnetically permeable cavity body 10B, so as to convert kinetic energy into electric power. An end of an upper shell 11B of the magnetically permeable cavity body 10B extends outward to form an upper rim 111B, while another end thereof extends outward and downward to form a middle column 12B. Namely, the middle column 12B is extended from an end of the upper shell 11B and is parallel to the upper shell 11B. In addition, there is a gap left between the two wings 13B of the magnetically permeable cavity body 10B, so as for the coil 30B to be sleeved on the middle column 12B. Person skilled in the art should be able to understand that the operating principle of the electricity generation of the high power kinetic energy generating device of the present preferred embodiment of the present invention is the same with it of the previous preferred embodiment of the present invention.

Figure 21A:
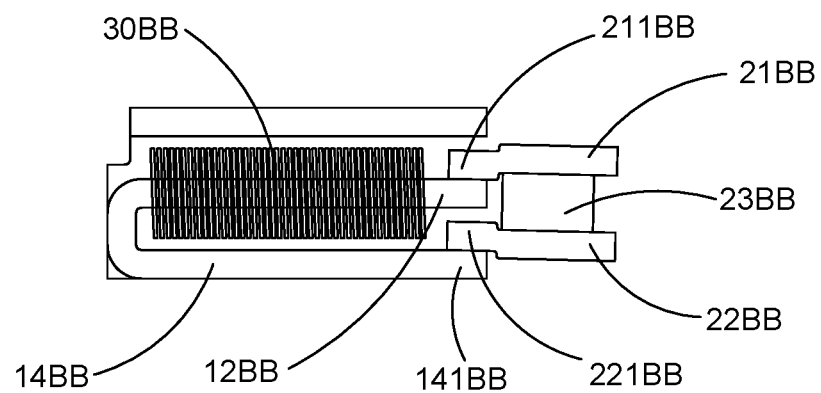
FIGS. 21A and 21B are perspective views illustrating the electromagnetic induction of a magnetically permeable cavity body according to another alternative mode of the above second preferred embodiment of the present invention.
Figure 21B:
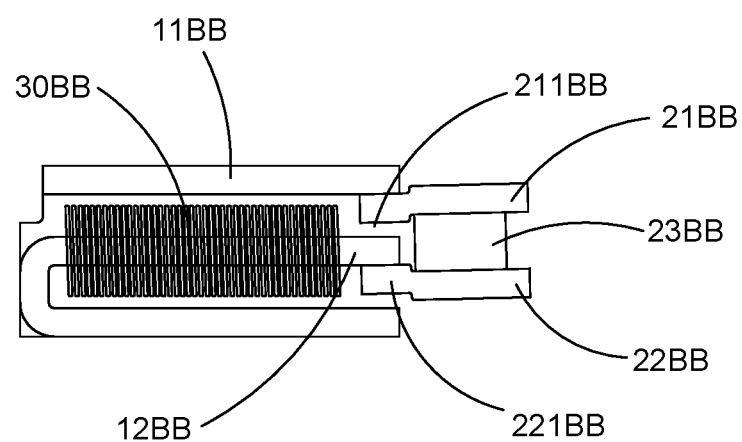

FIGS. 21A and 21B illustrate another alternative mode for the middle column 12B of the high power kinetic energy generating device according to the present invention. That is, an end of an lower shell 14BB of a magnetically permeable cavity body 10BB of the high power kinetic energy generating device extends outward to form an lower rim 141BB, while another end thereof extends outward and upward to form a middle column 12BB. Namely, the middle column 12BB is extended from an end of the lower shell 14BB and is parallel to the lower shell 14BB. In addition, there is a gap left between the two wings 13BB of the magnetically permeable cavity body 10BB, so as for the coil 30BB to be sleeved on the middle column 12BB.

A magnetic group 20BB of the high power kinetic energy generating device further comprises a upper magnetically permeable member 21BB, a lower magnetically permeable member 22BB, and a permanent magnet member 23BB arranged between the upper magnetically permeable member 21BB and the lower magnetically permeable member 22BB. An end of the upper magnetically permeable member 21BB extends outward to form an upper magnetically permeable member contact end 211BB. An end of the lower magnetically permeable member 22BB extends outward to form a lower magnetically permeable member contact end 221BB. The upper magnetically permeable member contact end 211BB and the lower magnetically permeable member contact end 221BB can be placed in the inside of the magnetically permeable cavity 100BB. The width between the upper magnetically permeable member contact end 211BB and the lower magnetically permeable member contact end 221BB is the width of the magnetic gap. The upper magnetically permeable member contact end 211BB and the lower magnetically permeable member contact end 221BB alternately contact an upper rim 111BB and a lower rim 141BB under external force, such that the direction of the magnetic induction lines that pass through the coil 30BB will alter, so as to generate induced current in the coil 30BB.

Person skilled in the art should be able to understand that the operating principle of the electricity generation of the high power kinetic energy generating device of the present preferred embodiment of the present invention is the same with it of the previous preferred embodiment of the present invention. That is to say, as the original state illustrated in FIG. 21A and the contact state after the magnetic group 20BB has moved illustrated in FIG. 21B, in the original state, the upper magnetically permeable member contact end 211BB connected with the N-pole of the permanent magnet member 23BB contacts the middle column 12BB and the lower magnetically permeable member contact end 221BB connected with the S-pole of the permanent magnet member 23BB contacts the lower rim 141BB. At this time, the magnetic induction lines are in a steady state and there is no induced current generated in the coil 30BB. Nevertheless, if the magnetic group 20BB is moved upward, it will make the upper magnetically permeable member contact end 211BB contact the upper rim 111BB. During the movement, the magnetic induction lines that pass through the coil 30BB will alter and this rapid change makes the coil generate induced current.

Figure 22:
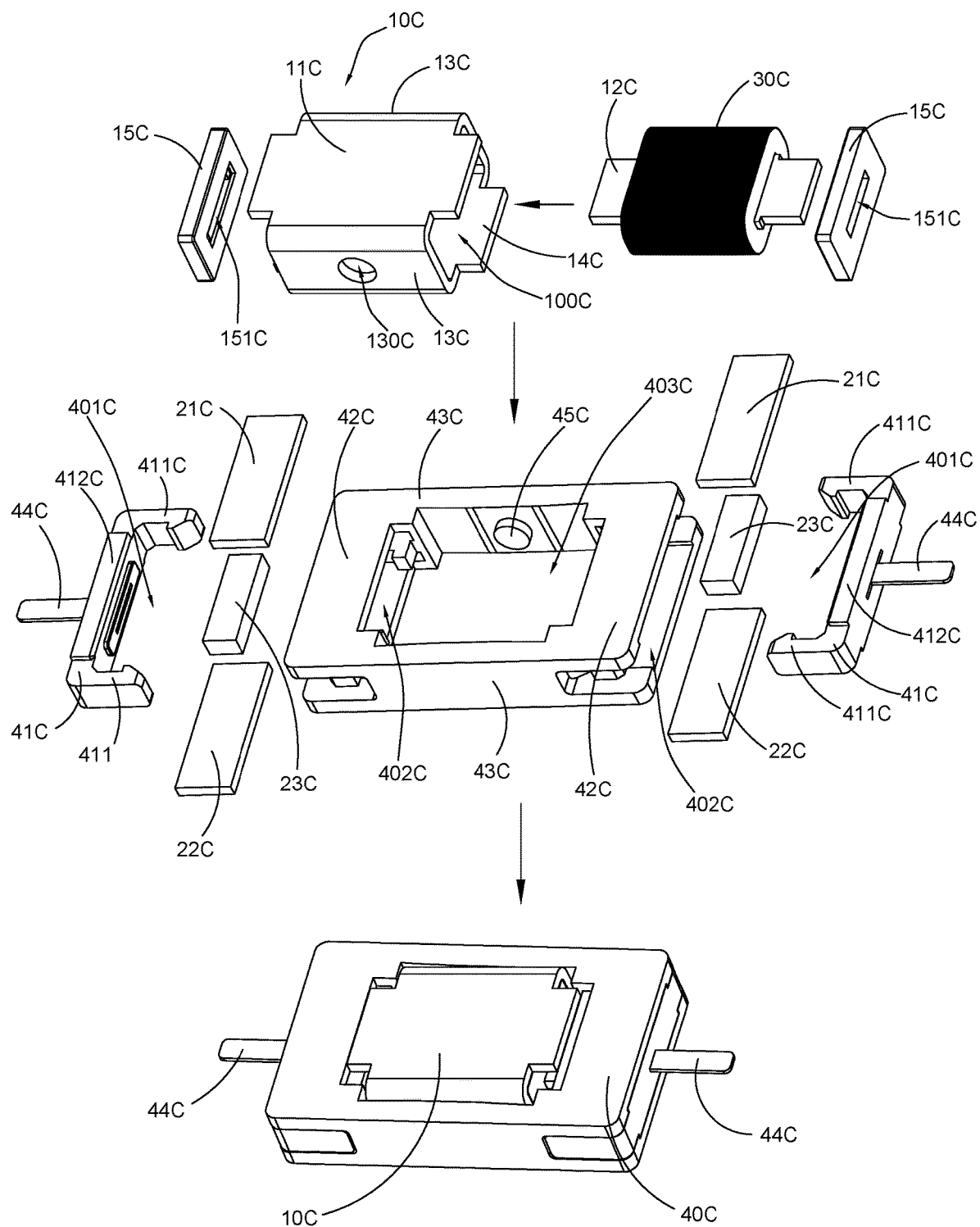
FIG. 22 is a perspective view illustrating the assembling of a high power kinetic energy generating device according to a third preferred embodiment of the present invention.
Figure 23A:
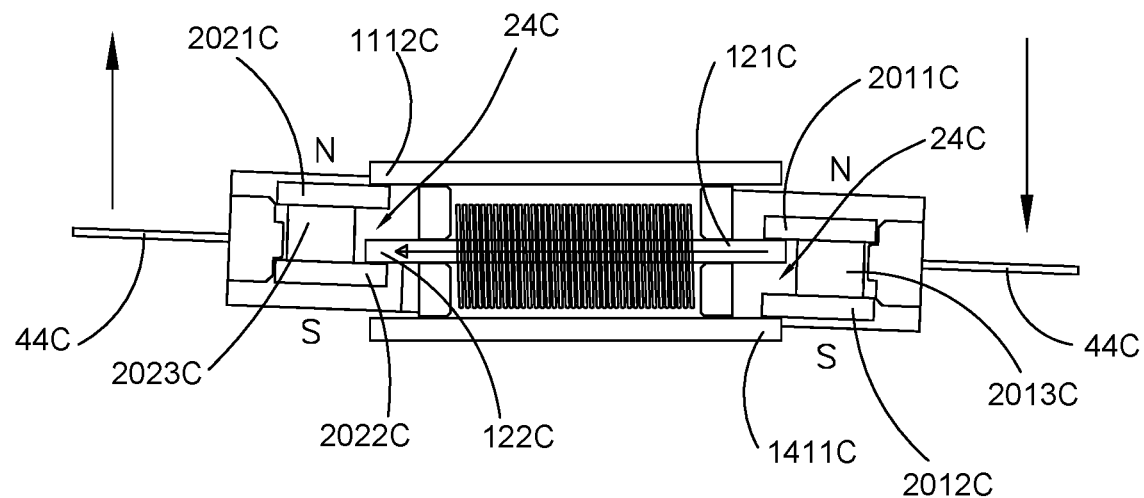
FIGS. 23A and 23B are perspective views illustrating the electromagnetic induction of the high power kinetic energy generating device according to the above third preferred embodiment of the present invention.
Figure 23B:
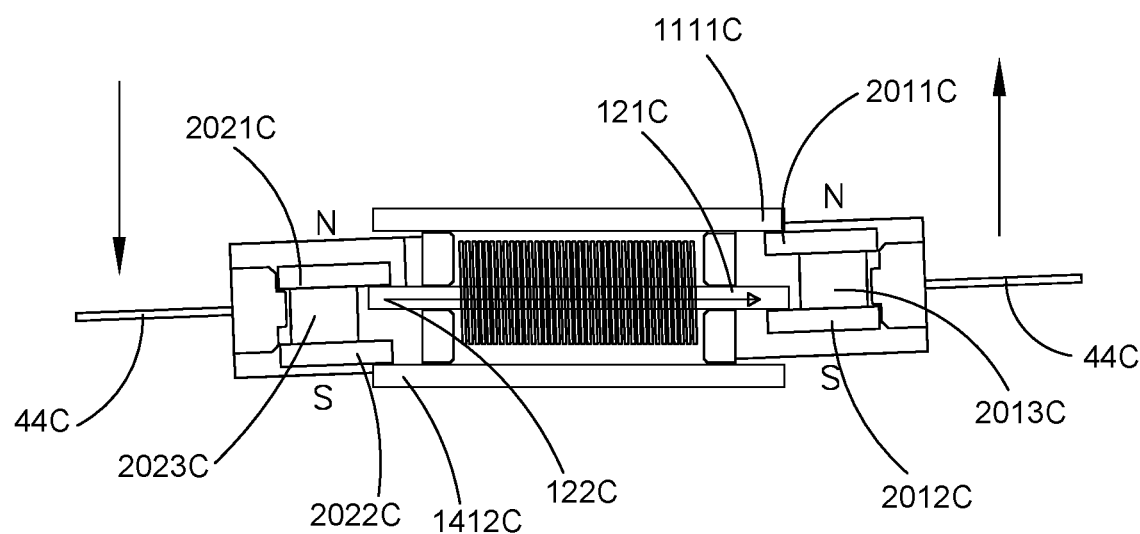

FIGS. 22-23B illustrate the high power kinetic energy generating device according to a third preferred embodiment of the present invention. The high power kinetic energy generating device comprises a magnetically permeable cavity body 10C, two magnetic groups 20C, and a coil 30C. The coil 30C is arranged in a magnetically permeable cavity 100C formed by the magnetically permeable cavity body 10C. The two magnetic groups 20C respectively move up and down on two sides of the magnetically permeable cavity body 10C, so as to convert kinetic energy into electric power. It is equivalent to two generators, which can therefore produce more power.

Specifically, the magnetically permeable cavity body 10C comprises an upper shell 11C, two wings 13C extended from the upper shell 11C, a lower shell 14C connected with the two wings 13C, and a middle column 12C. The upper shell 11C, the wings 13C, and the lower shell 14C jointly form a magnetically permeable cavity having two openings. The high power kinetic energy generating device further comprises two middle column holding brackets 15C, which can be made of non-magnetically permeable material and can close the two openings to form the magnetically permeable cavity 100C. Each the middle column holding bracket 15C has a middle column groove 151C arranged on the middle portion thereof. The two ends of the middle column 12C can respectively pass through the two middle column grooves 151C, such that the middle column 12C with the coil 30C sleeved thereon can be accommodated in the magnetically permeable cavity 100C. It is worth mentioning that the two ends of the middle column are partially emerged from the magnetically permeable cavity 100C.

The high power kinetic energy generating device further comprises a magnetic group driving device, which is embodied as a swinging mounting 40C that includes two driving members 44C respectively arranged on the two side thereof. The swinging mounting 40C comprises a magnetically permeable cavity body holding groove 403C and two magnetic group holding grooves 402C to respectively affix the magnetically permeable cavity body 10C and the two magnetic groups 20C, such that the magnetically permeable cavity body 10C stays motionless in the middle of the magnetically permeable cavity body groove 401C and allows the two magnetic groups 20C to move through the swinging of the swinging mounting, so as to generate stronger electric power.

Specifically, each the wing 13C of the magnetically permeable cavity body 10C comprises a shaft socket 130C arranged thereon. The swinging mounting 40C further comprises two mounting rotation shafts 45C respectively arranged on the inner surface of the two opposite sides of the magnetically permeable cavity body groove 401C. The mounting rotation shafts 45C are respectively fit into the shaft sockets 130C, so as to allow the swinging mounting 40C to rotate around the mounting rotation shaft 45C. It is understandable that the positions of the shaft sockets 130C and the mounting rotation shafts 45C may also be switched.

More specifically, the swinging mounting 40C further comprises two magnetic group lids 41C, two mounting bases 42C, and a swing arm set 43C. Each the mounting base 42C comprises two mounting base portions to form the magnetic group holding groove 402C. The swing arm set 43C is extended outward from the two mounting bases 42C. The swing arm set 43 and the mounting bases 42C form the magnetically permeable cavity body holding groove 403C, such that the magnetically permeable cavity body 10C can be accommodated in the magnetically permeable cavity body holding groove 403C. The two mounting rotation shafts 45C are respectively arranged on the inner surface of the two swing arm sets 43C.

Each the magnetic group 20C is arranged in a lid coupling recess 401C formed by each the magnetic group lid 41C and each the magnetic group lid 41C is arranged in each the magnetic group holding groove 402C, such that the two magnetic groups 20C are respectively held in the swinging mounting 40C. More specifically, each of the two magnetic group lids 41C further comprises one lid coupling base plate 412C and two lid coupling arms respectively extended outward from two sides of the lid coupling base plate 412C to form the lid coupling recess 401C. The upper magnetically permeable member 21C, the lower magnetically permeable member 22C, and the permanent magnet member 23C of the magnetic group 20C are interconnected and arranged in the lid coupling recess 401C. Each the magnetic group lid 41C is arranged in the magnetic group holding groove 402C, such that each the magnetic group 20C is accommodated in each magnetic group holding groove 402C respectively. The driving members 44C are respectively connected with the two lid coupling base plates 412C.

That is to say, referring to FIG. 22, the coil 30C is arranged in the magnetically permeable cavity 100C of the magnetically permeable cavity body 10C and sleeved on the middle column 12C. The two magnetic group lids 41C of the swinging mounting 40C respectively arrange the two magnetic groups 20C in the magnetic group holding grooves 402C respectively. The two driving members 44C are respectively connected on the two magnetic group lids 41C of the swinging mounting 40C, such that the two driving members 44C can drive the two magnetic groups 20C to respectively displace and swing up and down, so as to generate two time of induced electromotive in the coil 30C under the same parameters.

Each the magnetic group 20C further comprises a upper magnetically permeable member 21C, a lower magnetically permeable member 22C, and a permanent magnet member 23C arranged between the upper magnetically permeable member 21C and the lower magnetically permeable member 22C. The upper magnetically permeable member 21C and the lower magnetically permeable member 22C respectively have an end thereof inserted in the magnetically permeable cavity 100C. The width between the upper magnetically permeable member 21C and the lower magnetically permeable member 22C is the width of the magnetic gap. The two ends of the middle column 12C are respectively extended into the magnetic gaps 24C respectively between the upper magnetically permeable members 21C and the lower magnetically permeable members 22C of the two magnetic groups 20C. The upper magnetically permeable member 21C and the lower magnetically permeable member 22C alternately contact an upper rim 111C and a lower rim 112C of the magnetically permeable shell 11C under external force and the two ends of the middle column 12C alternately contact the upper magnetically permeable member 21C and the lower magnetically permeable member 22C of each the magnetic group 20C, such that the direction of the magnetic induction lines that pass through the coil 30C alter, so as to generate induced current in the coil 30C. It is worth mentioning that the two ends of the middle column 12C in a place may respectively contact the upper magnetically permeable member 21C of a first magnetic group 20C and the lower magnetically permeable member 22C of a second magnetic group 20C, but the two ends of the middle column 12C in another place may respectively contact the lower magnetically permeable member 22C of the above first magnetic group 20C and the upper magnetically permeable member 21C of the above second magnetic group 20C.

FIGS. 23A and 23B illustrate the operating principle of the high power kinetic energy generating device according to the present embodiment. The left-right swinging around the magnetically permeable cavity will create two different contact states. The switch of the contact states will change the direction of the magnetic induction lines passing through the coil, so as to generate induced electromotive in the coil.

More specifically, in order to illustrate the operating principle more clearly, the two magnetic groups 20C are respectively further marked as the left side magnetic group 202C and the right side magnetic group 201C in FIGS. 23A and 23B. Correspondingly, the components of the left side magnetic group 202C are labelled as an upper magnetically permeable member 2021C, a lower magnetically permeable member 2022C, and a permanent magnet member 2023C, while the components of the right side magnetic group 201C are labelled as an upper magnetically permeable member 2011C, a lower magnetically permeable member 2012C, and a permanent magnet member 2013C Correspondingly, the two ends of the middle column 12C are respectively labelled as 122C and 121C. Correspondingly, the two upper rims 111C of the upper shell 11C are respectively labelled as 1112C and 1111C. The two lower rims 141C of the lower shell 14C are respectively labelled as 1412C and 1411C.

FIG. 23A illustrates a supposed original state. In the original state of "left-up and right-down," the upper magnetically permeable member 2021C of the left is connected with the N-pole of the permanent magnet member 2023C and contacts with the upper rim 1112C. The lower magnetically permeable member 2022C is connected with the S-pole of the permanent magnet member 2023C and contacts the middle column 122C. At this time, the direction of the magnetic induction lines in the left can be considered from the N-pole of the permanent magnet member 2023C to the S-pole of the permanent magnet member 2023C. That is, the direction of the magnetic induction lines is from the upper rim 1112C to the middle column 122C. Correspondingly, the upper magnetically permeable member 2011C connected with the N-pole of the permanent magnet member 2013C and contacts the middle column 121C in the right. At this time, the lower magnetically permeable member 2012C connected with the S-pole of the permanent magnet member 2013C contacts the lower rim 1411C. Here, the direction of the magnetic induction lines of the right side can be seen as from the N-pole of the permanent magnet member 2013C to the S-pole of the permanent magnet member 2013C. Namely, the direction of the magnetic induction lines of the right side is from the lower rim 1411C to the right side of the middle column 122C. At the same time, the direction of the magnetic induction lines in the middle column 12C is from the right end 121C of the middle column to the left end 122C of the middle column. In the supposed original state, the magnetic induction lines are in a steady state and there is no induced current generated in the coil 30C. It is understandable that the arrangement of the N-pole and S-pole of the permanent magnet member 2023C is just exemplar. In other alternative mode, it may have the S-pole on the top and the N-pole on the bottom.

Referring to FIG. 23B, if the driving members 44C are respectively utilized to move the magnetic group 202C downward along the direction of the arrowhead of the solid line and to move the right side magnetic group 201C upward along the direction of the arrowhead of the solid line, for the left side magnetic group 202C, the upper magnetically permeable member 2021C will contact the middle column 122C and the lower magnetically permeable member 2022C will contact the lower rim 1412C. For the right side magnetic group 201C, the upper magnetically permeable member 2011C will contact the upper rim 2011C and the lower magnetically permeable member 2012C will contact the middle column 121C. During the movement, the magnetic induction lines that pass through the coil 30C will alter and this rapid change makes the coil generate induced current.

Hence, the left-right swinging of the swinging mounting 40C around the magnetically permeable cavity body 10C will create two different contact states of the two magnetic groups 20C. The switch of the contact states will change the direction of the magnetic induction lines passing through the coil 30C, so as to generate a stronger induced electromotive in the coil 30C. In addition, because there are two magnetic groups 20C, the present embodiment, in contrasting to the above first preferred embodiment of the present invention, is equivalent to two generators, which will generate stronger power under the same parameters and condition.

Correspondingly, a kinetic energy generating method provided by the present embodiment of the present invention comprises the following step:

allowing the magnetic group driving device to be driven to move by external force, such that the upper magnetically permeable members 21C and the lower magnetically permeable members 22C of the two magnetic groups 20C arranged on the magnetic group driving device will respectively alternately contact the two ends of the middle column 12C in the magnetically permeable cavity body 10C, so as for the coil 30C surrounding around the middle column 12C in the magnetically permeable cavity body 10C to generate an induced current and produce electric power. Correspondingly, according to this embodiment, the magnetic group driving device is embodied as a swinging mounting 40C, such that when the swinging mounting 40C is driven by external force to pivot relatively to the magnetically permeable cavity body 10C, the magnetic group 20C will be driven to displace. It is understandable that, according to another embodiment, the swinging mounting 40C may be anchored while the magnetically permeable cavity body 10C be driven to move, so as for the coil 30C surrounding around the middle column 12C in the magnetically permeable cavity body 10C to generate an induced current and produce electric power.

Further, the two driving members 44C of the swinging mounting 40C are respectively driven to drive the swinging mounting to pivot, so as to bring the magnetic groups 20C in the swinging mounting 40C to displace synchronously. For instance, the driving member 44, which may be embodied as a reed in the left of the energy generating device that is in the state illustrated in FIG. 23A may be pressed down, such that the magnetic group 20C in the left will swing downward and the magnetic group 20C in the right will swing upward, rendering the two ends of the middle column 12C respectively contact different magnetically permeable members to generate induced current in the coil 30C surrounding around the middle column 12C. Similarly, the driving member 44C, which may be embodied as a reed in the right of the energy generating device that is in the state illustrated in FIG. 23B may be pressed down, such that the magnetic group 20C in the right will swing downward and the magnetic group 20C in the left will swing upward, rendering the two ends of the middle column 12C respectively contact different magnetically permeable members to generate another induced current in the coil 30C surrounding around the middle column 12C.

FIGS. 24-30B illustrate a high power kinetic energy generating device according to another embodiment, wherein the high power kinetic energy generating device comprises an upper magnetism seal lid and a lower magnetism seal lid respectively made of magnetically permeable material and has the electricity generation components, such as the permanent magnet member, the coil, the middle column, and etc. be accommodated therein, so as to achieve the maximum utilization of the magnetic energy as well as the minimal size. The upper magnetism seal lid and the lower magnetism seal lid may form a dismountable structure in a manner of top down covering with magnetically permeable material. They may also be integrally formed, bent, and folded to accommodate the electricity generation components, such as the permanent magnet member, the coil, the middle column, and etc. therein and to become a non-dismountable structure.

Figure 24:
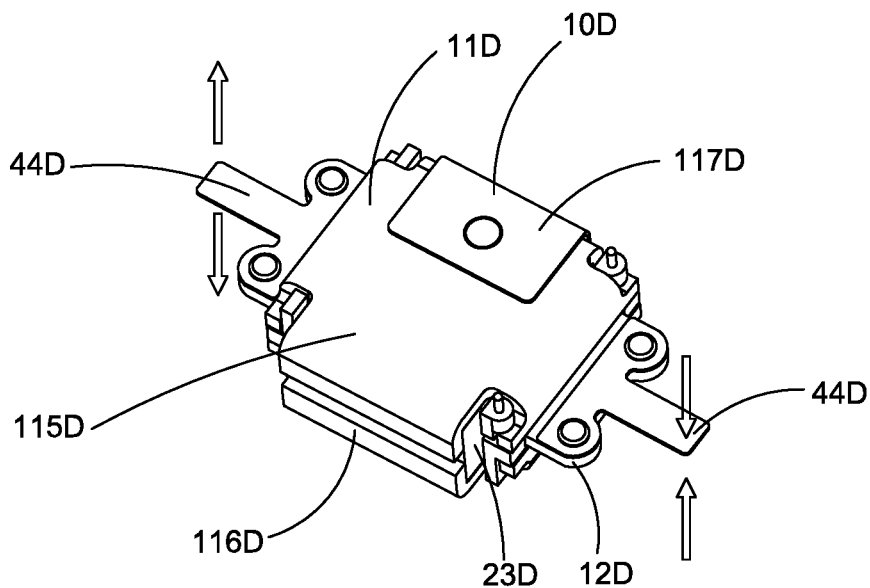
FIG. 24 is a perspective view of a high power kinetic energy generating device according to a fourth preferred embodiment of the present invention.

Specifically, FIG. 24 is a perspective view of a high power kinetic energy generating device according to the present preferred embodiment of the present invention. The high power kinetic energy generating device comprises a magnetically permeable cavity body 10D, a permanent magnet member 23D, and a coil 30D. The coil 30D is arranged in a magnetically permeable cavity 100D defined by the magnetically permeable cavity body 10D and the permanent magnet member 23D is provided in the magnetically permeable cavity 100D.

Figure 25:
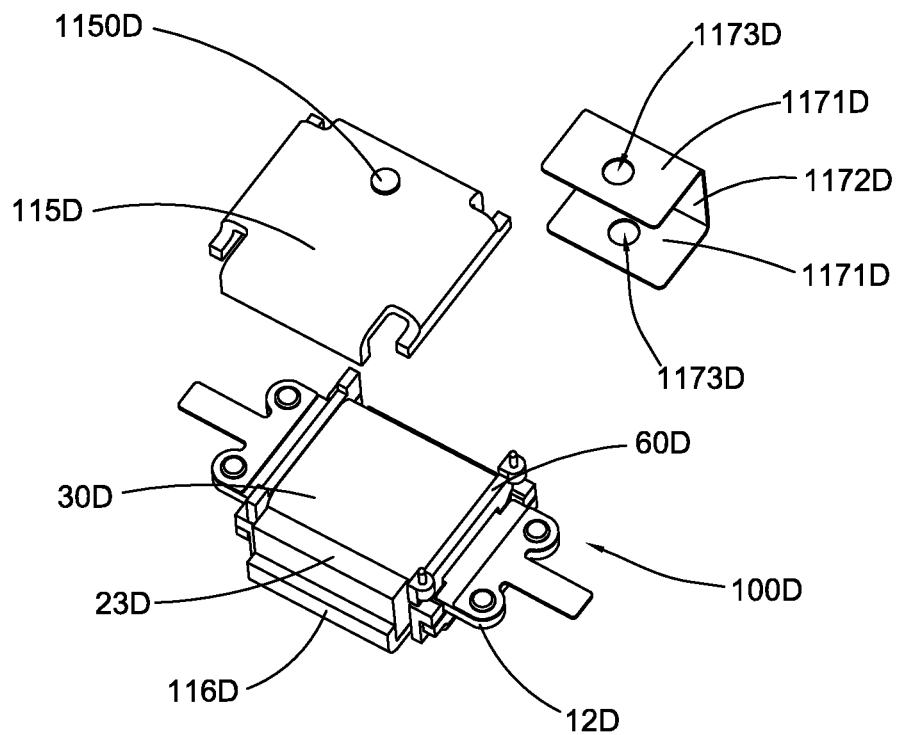
FIG. 25 is an exploded view of a high power kinetic energy generating device according to the above fourth preferred embodiment of the present invention.

More specifically, referring to FIG. 25, the magnetically permeable cavity body 10D comprises a magnetically permeable shell 11D and a middle column 12D. The magnetically permeable shell 11D further comprises an upper magnetism seal lid 115D, a lower magnetism seal lid 116D, and a holding member 117D. The holding member 117D may be embodied as a clamp, which is able to clamp the upper magnetism seal lid 115D and the lower magnetism seal lid 116D therewithin in order to form the magnetically permeable cavity 100D. The magnetically permeable cavity 100D can accommodate the permanent magnet member 23D, the middle column 12D, and the coil 30D therein. In other words, the coil 30D is arranged in the magnetically permeable shell 11D, inside of the magnetically permeable cavity 100D, and around the middle column 12D.

The high power kinetic energy generating device further comprises a coil framework 60D. The coil 30D is winded on the periphery of the coil framework 60D. According to this embodiment of the present invention, the coil framework 60D, the coil 30D, and the middle column 12D can be defined as a coil unit. The coil unit and the permanent magnet member 23D are enclosed in the magnetically permeable cavity body 10D formed by the upper magnetism seal lid 115D and the lower magnetism seal lid 116D into a whole. Here, the middle column 12D may swing under external force. According to the embodiment illustrated in this figure, the coil 30D is arranged on the coil framework 60D and the coil framework 60D is arranged around the middle column 12D, such that the coil 30D can surround around the middle column 12D. It is understandable that, according to other alternative mode, the coil 30D may also be winded on the middle column 12D and the middle column 12D can be allowed to be driven to pivot through some support structure.

Figure 26A:
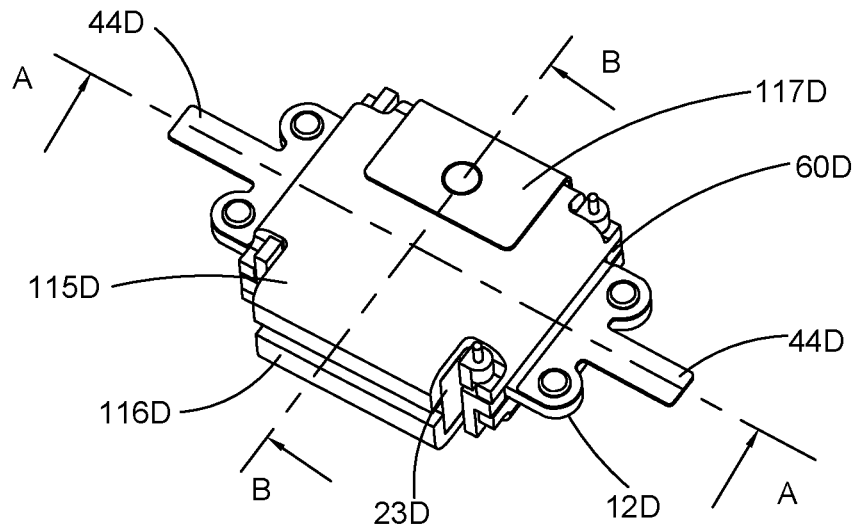
FIG. 26A is a perspective view of a high power kinetic energy generating device according to the above fourth embodiment of the present invention.
Figure 26B:
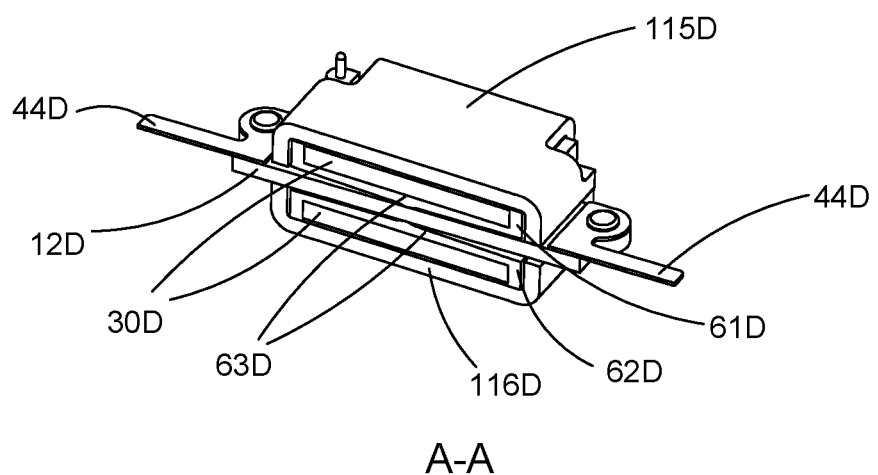
FIG. 26B is a sectional view of FIG. 26A along an A-A line.
Figure 26C:
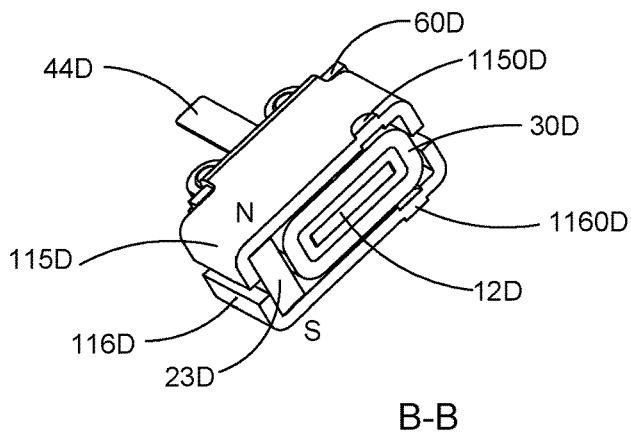
FIG. 26C is a sectional view of FIG. 26A along a B-B line.

It is worth mentioning that, referring to FIGS. 25-26C, FIG. 26B is a sectional view of FIG. 26A along the A-A line, while FIG. 26C is a sectional view of FIG. 26A along the B-B line. The holding member 117D comprises two clamp plates 1171D and a clamp connecting plate 1172D extended between the two clamp plates 1171D to form a clamp slot 1170D. The holding member 117D that has the clamp slot 1170D can hold the upper magnetism seal lid 115D and the lower magnetism seal lid 116D therein, so as to maintain the closure of the magnetically permeable cavity 100D. It is understandable that the structure of the holding member 117D that has the two clamp plates 1171D and the clamp connecting plate 1172D as mentioned above is only an embodiment, which shall not limit the present invention. Person skilled in the art should be able to think of other alternative structure for the spacing clamp for the upper magnetism seal lid 115D and the lower magnetism seal lid 116D. For instance, it may also be a spacing jacket sleeving on the upper magnetism seal lid 115D and the lower magnetism seal lid 116D.

According to the present preferred embodiment, in order to enhance the stability, the two clamp plate 116D further have attachment holes 1173D or protruding points thereon and, correspondingly, the upper magnetism seal lid 115D and the lower magnetism seal lid 116D respectively have matchable clamp protruding points 1150D or clamp attachment holes 1160D. Therefore, when each the clamp protruding point is anchored in the clamp attachment hole respectively, the holding member 117D, the upper magnetism seal lid 115D, and the lower magnetism seal lid 116D will not move relatively and the relative closure of the magnetically permeable cavity body 10D can be maintained, which reduces magnetic leakage thereof.

According to this embodiment of the present invention, the magnetic gaps 118D are formed by the edges of the two sides of the upper magnetism seal lid 115D and the lower magnetism seal lid 116D and the permanent magnet member 23D is held between the upper magnetism seal lid 115D and the lower magnetism seal lid 116D. The middle column 12D is held by the coil framework 60D and sleeved by the coil 30D. Because the coil framework 60D comprises an upper coil framework 61D, a lower coil framework 62D, and a pair of framework supporting points 63D arranged between the upper coil framework 61D and the lower coil framework 62D, the middle column 12D may utilize the framework supporting points 63D as the swinging supporting points to swing between the magnetic gaps and alternately contact the edges of the upper magnetism seal lid 115D and the lower magnetism seal lid 116D, such that the direction of the magnetic field through the inside of the coil will alter and induced current will then be generated.

Figure 27:
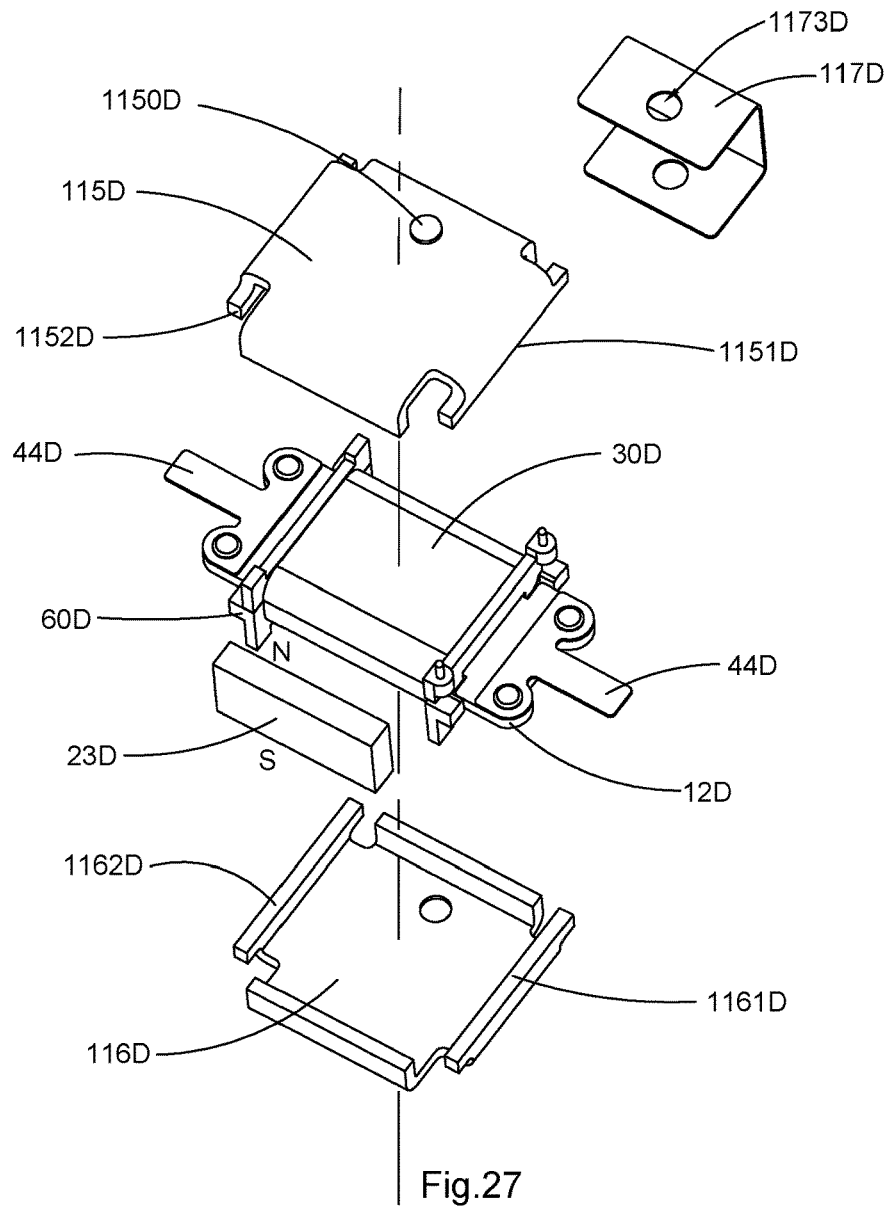
FIG. 27 is an exploded view of the high power kinetic energy generating device according to the above fourth preferred embodiment of the present invention.

Referring to FIG. 27, it is for keeping the relative closeness of the magnetically permeable cavity body 10D and forming magnetic gaps 118D between the edges of the two sides of the upper magnetism seal lid 115D and the lower magnetism seal lid 116D. More specifically, the edge of the upper magnetism seal lid 115D extends downward to form two upper close contact ends and two upper middle column contact end 1151D and 1152D. Correspondingly, the lower magnetism seal lid 116D extends upward to form two lower close contact ends and two lower middle column contact end 1161D and 1162D. As the upper magnetism seal lid 115D and the lower magnetism seal lid 116D are clamped and held by the holding member 117D, the two upper close contact ends and the two lower close contact ends are tightly attached with each other, so as to form two sealed side walls of the magnetically permeable cavity body 10D. The permanent magnet member 23D is provided in the inner side of the two sealed side walls. A gap is left between the upper middle column contact end 1151D and the lower middle column contact end 1162D. Correspondingly, there is a gap left between the upper middle column contact end 1152D and the lower middle column contact end 1162D. As a result, the magnetic gaps 118D between the edges of the two sides of the upper magnetism seal lid 115D and the lower magnetism seal lid 116D can respectively be formed.

Figure 28A:
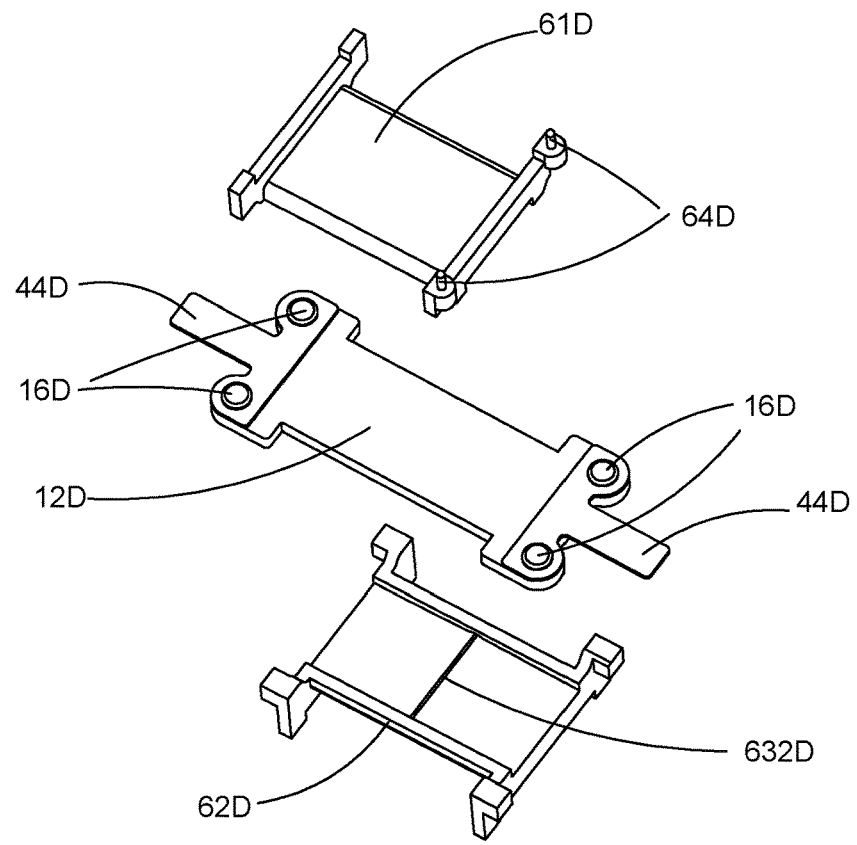
FIG. 28A is an exploded view of part of a high power kinetic energy generating device according to the above fourth preferred embodiment of the present invention.
Figure 28B:
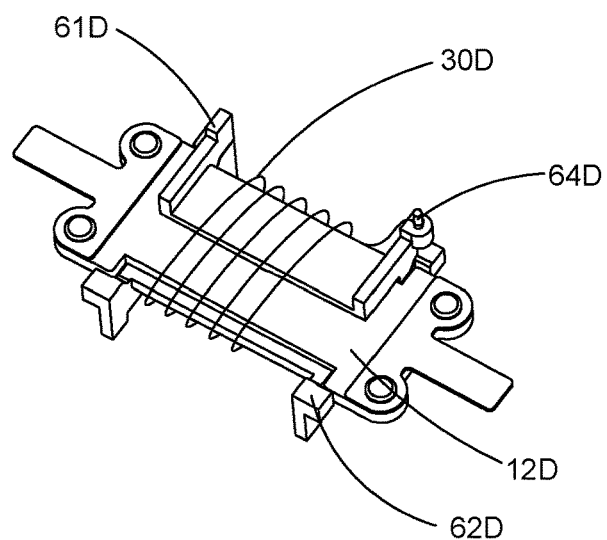
FIG. 28B illustrates a coil sleeved on the outside of a middle column and a coil framework according to the above fourth preferred embodiment of the present invention.

The high power kinetic energy generating device further comprises at least a driving member 44D connected with an end portion of the middle column 12D. For example, in this embodiment of the present invention, the two driving members 44D are arranged to respectively be connected with the two sides of the middle column 12D protruded from the magnetically permeable cavity body 10D and are respectively embodied as a reed. Therefore, when the driving members 44D swing under external force, the two ends of the middle column 12D will be brought to swing up and down and alternately contact the upper magnetism seal lid 115D and the lower magnetism seal lid 116D. In order for the middle column 12D to swing more smoothly and stably, as FIGS. 28A and 28B illustrated, more specifically, the pair of framework supporting points 63D comprises an upper supporting point 631D and a lower supporting point 632D. The upper supporting point 631D is arranged at the middle position of the inner side of the upper coil framework 61D. The lower supporting point 632D is arranged at the middle position of the inner side of the lower coil framework 62D. Here, the inner side refers to the side facing the middle column 12D. Hence, according to this embodiment of the present invention, the coil framework 60D comprises the upper coil framework 61D and the lower coil framework 62D and holds the middle column 12D in the middle thereof, so as to allow the middle column 12D to swing on the framework supporting points 63D in the middle of the coil framework 60D It is understandable that the high power kinetic energy generating device may also have only one the driving member 44D, which is embodied as a reed. Then the framework supporting points 63D can be arranged at the position of the middle or from the middle on the inner side of the coil framework. Alternatively, the framework supporting points 63D can also be arranged on a side of the coil framework, while the driving member is arranged on the other side to be driven to swing.

It is worth mentioning that after the middle column 12D passed through the coil framework 60D, the wire is winded on the periphery of the coil framework 60D for 100-1200 turns to form the coil 30D. Then, the two ends of the coil 30D are respectively connected to the two lead wire columns 64D respectively on the two ends of the coil framework 60D, which make it easier to solder and weld the high power kinetic energy generating device onto the circuit board of an electronic product.

Figure 29:
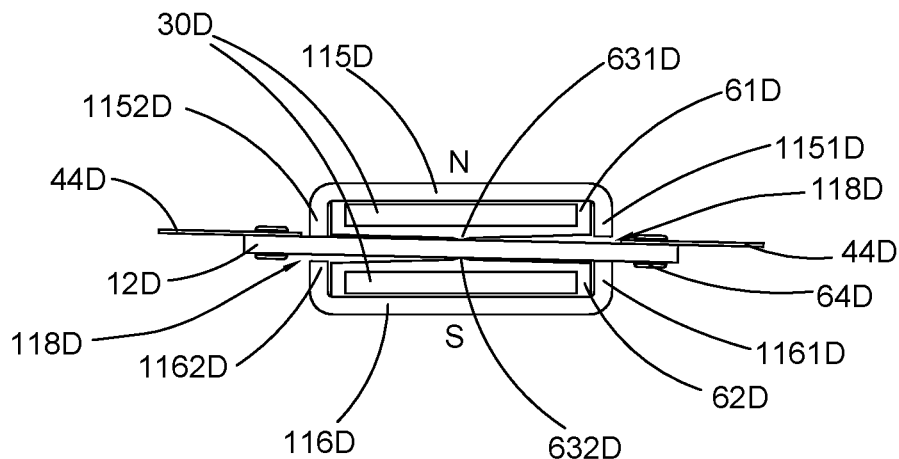
FIG. 29 is a side sectional view of the above part of the high power kinetic energy generating device according to the above fourth preferred embodiment of the present invention.

It is worth mentioning that, as FIG. 29 illustrated, the middle column 12D can be provided between the upper magnetism seal lid 115D and the lower magnetism seal lid 116D to utilize the upper supporting point 631D and the lower supporting point 632D of the coil framework as the axle center to swing in a small scale. Here, preferably, the range of the swing angle is 1~10 degrees. Preferably, the range of the gap for the swinging of the middle column 12D between the upper magnetism seal lid 115D and the lower magnetism seal lid 116D is 0.1~8 mm.

It is worth mentioning that the high power kinetic energy generating device further comprises a plurality of connecting members, such as rivets 16D and etc. Each rivet 16D can respectively connect the two ends of the middle column 12D with the two driving members 44D, such that when the driving members 44D swing under external force, the middle column will be brought by the driving members 44D to slightly swing.

Figure 30A:
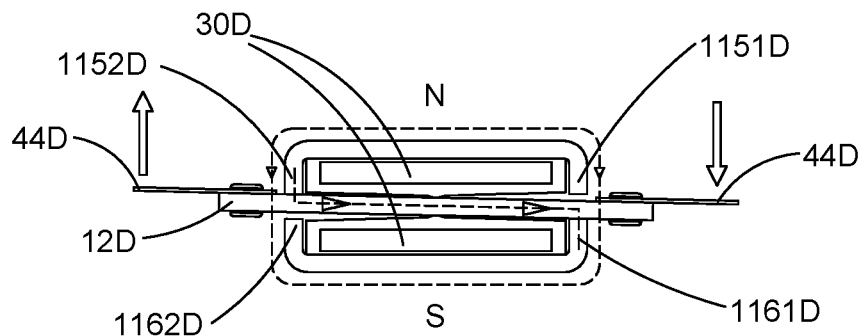
FIGS. 30A and 30B are sectional views illustrating the induced current generation of the high power kinetic energy generating device according to the above fourth embodiment of the present invention.
Figure 30B:
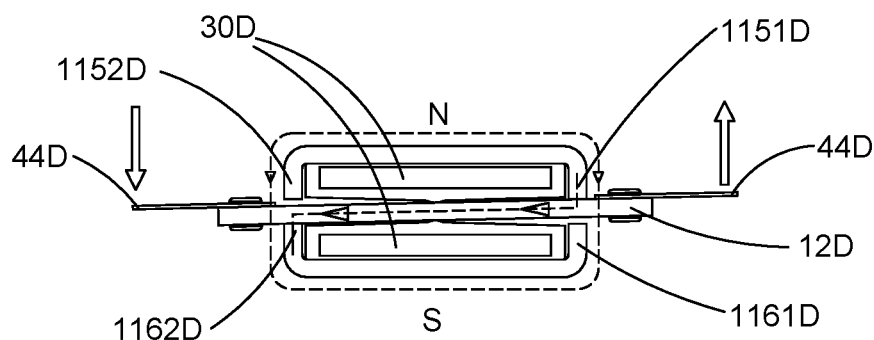

FIGS. 30A and 30B illustrate the operating principle of the high power kinetic energy generating device. The arrowhead dashed lines indicate the conducting directions of the magnetic induction lines. Referring to the supposed original state illustrated in FIG. 30A, the contact state of the middle column 12D, the upper magnetism seal lid 115D, and the lower magnetism seal lid 116D are respectively as the following: the left side of the middle column 12D contacts the upper middle column contact end 1152D and the right side of the middle column 12D contacts the lower middle column contact end 1161D. As the direction of arrow in FIG. 30A illustrated, the direction of the magnetic induction lines passing through the coil 30D is from left to right, the middle column 12D stays still, and there is no induced current generated in the coil 30D.

Further, as FIG. 30B illustrated, the driving members 44D are pushed along the directions of arrow respectively. For instance, as the driving member 44D of the left is pressed down, the contact state of the middle column 12D, the upper magnetism seal lid 115D, and the lower magnetism seal lid 116D will be changed respectively. The contact state in FIG. 30B is as the following: the left side of the middle column 12D contacts the lower middle column contact end 1162D and the right side of the middle column 12D contacts the upper middle column contact end 1151D. Referring to the direction of arrow, the direction of the magnetic induction lines passing through the coil 30D has been turned into from right to left. That is, the direction of the magnetic induction lines has been inversed. Such sudden change of the magnetic induction lines will generate induced current in the coil 30D during the process. The function of the driving members 44D here is to store potential energy and to accelerate the swinging of the middle column 12D, so as to further strengthen the induced power.

It is worth mentioning that, according to the present embodiment of the present invention, when the magnetically permeable cavity body of the high power kinetic energy generating device is embodied as the structure of the upper magnetism seal lid and the lower magnetism seal lid 115D and 116D in the semi-closed state, the coil 30D will receive the maximum influence by the magnetic induction lines. Besides, the magnetic leakage will be smaller in this structure, such that the power generation efficiency of the high power kinetic energy generating device will be higher.

Correspondingly, a kinetic energy generating method provided by the present embodiment of the present invention comprises the following step:

driving a pair of opposite framework 60D mountings of the middle column 12D to pivotally move relatively with the coil framework, such that the two ends of the middle column 12D will respectively alternately contact the upper magnetism seal lid 115D and the lower magnetism seal lid 116D at the two ends of the permanent magnet member 23D, so that the direction of the magnetic induction lines that pass through the coil 30D surrounding around the coil framework 60D changes and renders the coil 30D to generate an induced current.

It is understandable that the upper magnetism seal lid 115D and the lower magnetism seal lid 116D clamp and hold the permanent magnet member 23D and respectively leave gaps in the two sides to form the magnetic gaps 118D. When the middle column 12D reaches the position of the two poles, it will be in a tilting manner. As a result, when an end thereof contacts the lower magnetism seal lid 116D, the other end thereof will contact the upper magnetism seal lid 115D; oppositely, when the first end thereof contacts the upper magnetism seal lid 115D, the other end thereof will contact the lower magnetism seal lid 116D.

The two ends of the middle column 12D respectively have one the driving member 44D connected. This kinetic energy generating method further comprises the following steps: driving the driving member 44D, so as to make the middle column 12D pivot and alter the direction of the magnetic induction lines passing through the coil 30D, such that an induced current is generated in the coil 30D; and driving another driving member 44D, so as to make the middle column 12D pivot inversely and alter the direction of the magnetic induction lines passing through the coil 30D, such that another induced current is generated in the coil 30D.

It is understandable that, according to this embodiment, the coil 30D and the permanent magnet member 23D are located in the magnetically permeable cavity 100D formed by the upper magnetism seal lid 115D and the lower magnetism seal lid 116D. Besides, the upper magnetism seal lid 115D and the lower magnetism seal lid 116D are respectively on the two sides of the permanent magnet member 23D, so as to form two magnetically permeable members.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A kinetic energy generating device, comprising:
   a magnetically permeable cavity body, comprising an upper magnetism seal lid and a lower magnetism seal lid and defining a magnetically permeable cavity, wherein said upper magnetism seal lid and said lower magnetism seal lid form a covered magnetically permeable cavity body;
   a middle column;

a permanent magnet member, jointly arranged between said upper magnetism seal lid and said lower magnetism seal lid;

a coil surrounding around said middle column, wherein both said coil and said permanent magnet member are arranged in said magnetically permeable cavity, wherein a magnetic gap is defined between said upper magnetism seal lid and said lower magnetism seal lid, wherein said middle column passes through said magnetic gap and is structured to alternately contact said upper magnetism seal lid and said lower magnetism seal lid, so as to alter magnetic induction lines passing through said coil to generate induced current; and a coil framework with said coil surrounded thereon, wherein said middle column is held by said coil framework and sleeved by said coil, wherein said coil framework comprises a framework supporting point, so as to allow said middle column under external force to swing between said upper magnetism seal lid and said lower magnetism seal lid of said magnetic gap by utilizing said framework supporting point as a swinging supporting point, wherein said coil framework further comprises an upper coil framework and a lower coil framework, wherein said framework supporting point comprises an upper supporting point arranged at a center of an inner side of said upper coil framework and a lower supporting point arranged at a center of an inner side of said lower coil framework.

2. The kinetic energy generating device, as recited in claim 1, further comprising at least a driving member, connected with an end of said middle column extended from said magnetically permeable cavity body.

3. The kinetic energy generating device, as recited in claim 2, comprising one said driving member, which is a reed.

4. The kinetic energy generating device, as recited in claim 2, comprising two said driving members, which are reeds, connected with two ends of said middle column extended from said magnetically permeable cavity body respectively.

5. The kinetic energy generating device, as recited in claim 4, wherein said magnetically permeable cavity body has two sides, wherein two magnetic gaps are formed by said two sides respectively, wherein as an end of said middle column contacts said upper magnetism seal lid, an other end thereof contacts said lower magnetism seal lid, wherein said upper magnetism seal lid comprises two upper middle column contact ends extended downward from an edge thereof, wherein said lower magnetism seal lid comprises two lower middle column contact ends extended upward therefrom, wherein gaps left between corresponded said upper middle column contact ends and said lower middle column contact ends respectively become said magnetic gaps between edges of the two sides of said upper magnetism seal lid and said lower magnetism seal lid.

* * * * *